United States Patent [19]
Gombar

[11] Patent Number: 6,036,349
[45] Date of Patent: Mar. 14, 2000

[54] METHOD AND APPARATUS FOR VALIDATION OF MODEL-BASED PREDICTIONS

[75] Inventor: Vijay K. Gombar, Pittsford, N.Y.

[73] Assignee: Health Designs, Inc., Rochester, N.Y.

[21] Appl. No.: 08/687,726

[22] Filed: Jul. 26, 1996

[51] Int. Cl.$^7$ .................................................. G05B 13/04
[52] U.S. Cl. ............................................................ 364/578
[58] Field of Search ................................. 364/578, 570, 364/571.02, 571.04, 571.05, 149, 148

[56] References Cited

U.S. PATENT DOCUMENTS

| | | | |
|---|---|---|---|
| 5,347,446 | 9/1994 | Iino et al. | 364/149 |
| 5,406,486 | 4/1995 | Kamio et al. | 364/426.03 |
| 5,477,449 | 12/1995 | Iino | 364/149 |
| 5,519,605 | 5/1996 | Cawlfield | 364/151 |
| 5,659,667 | 8/1997 | Buescher et al. | 395/23 |

OTHER PUBLICATIONS

Mandel, John; The Regression Analysis of Collinear Data; Journal of Research of the Natioanl Bureau of Standards; vol. 90, No. 6; pp. 465–478; Nov.–Dec. 1985.

*Primary Examiner*—Kevin J. Teska
*Assistant Examiner*—Matthew Loppnow
*Attorney, Agent, or Firm*—Cumpston & Shaw

[57] ABSTRACT

Predictive models have always been sought in the physical, biological and social sciences, but the application of such models may not produce reliable results. Before accepting a prediction from any model, it is essential to ascertain that the model is applicable to make the prediction. The present invention generally relates to a method for validating a model based prediction and more specifically, to a method for validating whether selected models are applicable to selected queries and comparing the performance of the predictive model on a query object or point, etc., with the performance of the predictive model on an existing object having a shortest property sensitive similarity index from the query object or point, etc. in a data processing system.

29 Claims, 41 Drawing Sheets

FIGURE 2. DEC MICRO VAX II CPU TIME FOR
GENERATING OPS FOR n = 200

| P | CPU TIME/SEC |
|---|---|
| 12 | 18 |
| 23 | 27 |
| 34 | 47 |
| 45 | 80 |
| 56 | 125 |
| 67 | 201 |
| 78 | 270 |
| 89 | 422 |
| 100 | 571 |
| 144 | 1739 |
| 199 | 5191 |
| 232 | 9424 |

FIGURE 3. GENERAL DESCRIPTION OF THE PROBLEM.

OPS ANALYSIS FOR FISCHER IRIS DATA EXAMPLE

NO. OF DATA POITS = 150
NO. OF VARIABLES = 5

VARIABLES AVAILABLE FOR THIS ANALYSIS

1 Intercept
2 SEPAL_LENGTH
3 SEPAL_WIDTH
4 PETAL_LENGTH
5 PETAL_WIDTH

P-SPACE ASSOCIATED WITH THE GIVEN DATA.

|    | 1      | 2       | 3       | 4       | 5      |
|----|--------|---------|---------|---------|--------|
| 1  | 1.0000 | 50.0000 | 33.0000 | 14.0000 | 2.0000 |
| 2  | 1.0000 | 46.0000 | 34.0000 | 14.0000 | 3.0000 |
| 3  | 1.0000 | 46.0000 | 36.0000 | 10.0000 | 2.0000 |
| 4  | 1.0000 | 51.0000 | 33.0000 | 17.0000 | 5.0000 |
| 5  | 1.0000 | 55.0000 | 35.0000 | 13.0000 | 2.0000 |
| 6  | 1.0000 | 48.0000 | 31.0000 | 16.0000 | 2.0000 |
| 7  | 1.0000 | 52.0000 | 34.0000 | 14.0000 | 2.0000 |
| 8  | 1.0000 | 49.0000 | 36.0000 | 14.0000 | 1.0000 |
| 9  | 1.0000 | 44.0000 | 32.0000 | 13.0000 | 2.0000 |
| 10 | 1.0000 | 50.0000 | 35.0000 | 16.0000 | 6.0000 |
| 11 | 1.0000 | 44.0000 | 30.0000 | 13.0000 | 2.0000 |
| 12 | 1.0000 | 47.0000 | 32.0000 | 16.0000 | 2.0000 |
| 13 | 1.0000 | 48.0000 | 30.0000 | 14.0000 | 3.0000 |
| 14 | 1.0000 | 51.0000 | 38.0000 | 16.0000 | 2.0000 |
| 15 | 1.0000 | 48.0000 | 34.0000 | 19.0000 | 2.0000 |
| 16 | 1.0000 | 50.0000 | 30.0000 | 16.0000 | 2.0000 |
| 17 | 1.0000 | 50.0000 | 32.0000 | 12.0000 | 2.0000 |
| 18 | 1.0000 | 43.0000 | 30.0000 | 11.0000 | 1.0000 |
| 19 | 1.0000 | 58.0000 | 40.0000 | 12.0000 | 2.0000 |
| 20 | 1.0000 | 51.0000 | 38.0000 | 19.0000 | 4.0000 |
| 21 | 1.0000 | 49.0000 | 30.0000 | 14.0000 | 2.0000 |
| 22 | 1.0000 | 51.0000 | 35.0000 | 14.0000 | 2.0000 |
| 23 | 1.0000 | 50.0000 | 34.0000 | 16.0000 | 4.0000 |
| 24 | 1.0000 | 46.0000 | 32.0000 | 14.0000 | 2.0000 |
| 25 | 1.0000 | 57.0000 | 44.0000 | 15.0000 | 4.0000 |
| 26 | 1.0000 | 50.0000 | 36.0000 | 14.0000 | 2.0000 |
| 27 | 1.0000 | 54.0000 | 34.0000 | 15.0000 | 4.0000 |
| 28 | 1.0000 | 52.0000 | 41.0000 | 15.0000 | 1.0000 |
| 29 | 1.0000 | 55.0000 | 42.0000 | 14.0000 | 2.0000 |
| 30 | 1.0000 | 49.0000 | 31.0000 | 15.0000 | 2.0000 |
| 31 | 1.0000 | 54.0000 | 39.0000 | 17.0000 | 4.0000 |
| 32 | 1.0000 | 50.0000 | 34.0000 | 15.0000 | 2.0000 |
| 33 | 1.0000 | 44.0000 | 29.0000 | 14.0000 | 2.0000 |
| 34 | 1.0000 | 47.0000 | 32.0000 | 13.0000 | 2.0000 |
| 35 | 1.0000 | 46.0000 | 31.0000 | 15.0000 | 2.0000 |
| 36 | 1.0000 | 51.0000 | 34.0000 | 15.0000 | 2.0000 |
| 37 | 1.0000 | 50.0000 | 35.0000 | 13.0000 | 3.0000 |
| 38 | 1.0000 | 49.0000 | 31.0000 | 15.0000 | 1.0000 |
| 39 | 1.0000 | 54.0000 | 37.0000 | 15.0000 | 2.0000 |
| 40 | 1.0000 | 54.0000 | 39.0000 | 13.0000 | 4.0000 |
| 41 | 1.0000 | 51.0000 | 35.0000 | 14.0000 | 3.0000 |
| 42 | 1.0000 | 48.0000 | 34.0000 | 16.0000 | 2.0000 |
| 43 | 1.0000 | 48.0000 | 30.0000 | 14.0000 | 1.0000 |
| 44 | 1.0000 | 45.0000 | 23.0000 | 13.0000 | 3.0000 |
| 45 | 1.0000 | 57.0000 | 38.0000 | 17.0000 | 3.0000 |
| 46 | 1.0000 | 51.0000 | 38.0000 | 15.0000 | 3.0000 |
| 47 | 1.0000 | 54.0000 | 34.0000 | 17.0000 | 2.0000 |

FIGURE 4-A

| | | | | |
|---|---|---|---|---|
| 48 | 1.0000 | 51.0000 | 37.0000 | 15.0000 | 4.0000 |
| 49 | 1.0000 | 52.0000 | 35.0000 | 15.0000 | 2.0000 |
| 50 | 1.0000 | 53.0000 | 37.0000 | 15.0000 | 2.0000 |
| 51 | 1.0000 | 65.0000 | 28.0000 | 46.0000 | 15.0000 |
| 52 | 1.0000 | 62.0000 | 22.0000 | 45.0000 | 15.0000 |
| 53 | 1.0000 | 59.0000 | 32.0000 | 48.0000 | 18.0000 |
| 54 | 1.0000 | 61.0000 | 30.0000 | 46.0000 | 14.0000 |
| 55 | 1.0000 | 60.0000 | 27.0000 | 51.0000 | 16.0000 |
| 56 | 1.0000 | 56.0000 | 25.0000 | 39.0000 | 11.0000 |
| 57 | 1.0000 | 57.0000 | 28.0000 | 45.0000 | 13.0000 |
| 58 | 1.0000 | 63.0000 | 33.0000 | 47.0000 | 16.0000 |
| 59 | 1.0000 | 70.0000 | 32.0000 | 47.0000 | 14.0000 |
| 60 | 1.0000 | 64.0000 | 32.0000 | 45.0000 | 15.0000 |
| 61 | 1.0000 | 61.0000 | 28.0000 | 40.0000 | 13.0000 |
| 62 | 1.0000 | 55.0000 | 24.0000 | 38.0000 | 11.0000 |
| 63 | 1.0000 | 54.0000 | 30.0000 | 45.0000 | 15.0000 |
| 64 | 1.0000 | 58.0000 | 26.0000 | 40.0000 | 12.0000 |
| 65 | 1.0000 | 55.0000 | 26.0000 | 44.0000 | 12.0000 |
| 66 | 1.0000 | 67.0000 | 31.0000 | 44.0000 | 14.0000 |
| 67 | 1.0000 | 56.0000 | 30.0000 | 45.0000 | 15.0000 |
| 68 | 1.0000 | 58.0000 | 27.0000 | 41.0000 | 10.0000 |
| 69 | 1.0000 | 60.0000 | 29.0000 | 45.0000 | 15.0000 |
| 70 | 1.0000 | 57.0000 | 26.0000 | 35.0000 | 10.0000 |
| 71 | 1.0000 | 57.0000 | 29.0000 | 42.0000 | 13.0000 |
| 72 | 1.0000 | 49.0000 | 24.0000 | 33.0000 | 10.0000 |
| 73 | 1.0000 | 56.0000 | 27.0000 | 42.0000 | 13.0000 |
| 74 | 1.0000 | 57.0000 | 30.0000 | 42.0000 | 12.0000 |
| 75 | 1.0000 | 66.0000 | 29.0000 | 46.0000 | 13.0000 |
| 76 | 1.0000 | 52.0000 | 27.0000 | 39.0000 | 14.0000 |
| 77 | 1.0000 | 60.0000 | 34.0000 | 45.0000 | 16.0000 |
| 78 | 1.0000 | 50.0000 | 20.0000 | 35.0000 | 10.0000 |
| 79 | 1.0000 | 55.0000 | 24.0000 | 37.0000 | 10.0000 |
| 80 | 1.0000 | 58.0000 | 27.0000 | 39.0000 | 12.0000 |
| 81 | 1.0000 | 62.0000 | 29.0000 | 43.0000 | 13.0000 |
| 82 | 1.0000 | 59.0000 | 30.0000 | 42.0000 | 15.0000 |
| 83 | 1.0000 | 60.0000 | 22.0000 | 40.0000 | 10.0000 |
| 84 | 1.0000 | 67.0000 | 31.0000 | 47.0000 | 15.0000 |
| 85 | 1.0000 | 63.0000 | 23.0000 | 44.0000 | 13.0000 |
| 86 | 1.0000 | 56.0000 | 30.0000 | 41.0000 | 13.0000 |
| 87 | 1.0000 | 63.0000 | 25.0000 | 49.0000 | 15.0000 |
| 88 | 1.0000 | 61.0000 | 28.0000 | 47.0000 | 12.0000 |
| 89 | 1.0000 | 64.0000 | 29.0000 | 43.0000 | 13.0000 |
| 90 | 1.0000 | 51.0000 | 25.0000 | 30.0000 | 11.0000 |
| 91 | 1.0000 | 57.0000 | 28.0000 | 41.0000 | 13.0000 |
| 92 | 1.0000 | 61.0000 | 29.0000 | 47.0000 | 14.0000 |
| 93 | 1.0000 | 56.0000 | 29.0000 | 36.0000 | 13.0000 |
| 94 | 1.0000 | 69.0000 | 31.0000 | 49.0000 | 15.0000 |
| 95 | 1.0000 | 55.0000 | 25.0000 | 40.0000 | 13.0000 |
| 96 | 1.0000 | 55.0000 | 23.0000 | 40.0000 | 13.0000 |
| 97 | 1.0000 | 66.0000 | 30.0000 | 44.0000 | 14.0000 |
| 98 | 1.0000 | 68.0000 | 28.0000 | 48.0000 | 14.0000 |
| 99 | 1.0000 | 67.0000 | 30.0000 | 50.0000 | 17.0000 |

FIGURE 4-B

| | | | | | |
|---|---|---|---|---|---|
| 100 | 1.0000 | 66.0000 | 29.0000 | 49.0000 | 16.0000 |
| 101 | 1.0000 | 64.0000 | 28.0000 | 56.0000 | 22.0000 |
| 102 | 1.0000 | 67.0000 | 31.0000 | 56.0000 | 24.0000 |
| 103 | 1.0000 | 63.0000 | 28.0000 | 51.0000 | 15.0000 |
| 104 | 1.0000 | 69.0000 | 31.0000 | 51.0000 | 23.0000 |
| 105 | 1.0000 | 65.0000 | 30.0000 | 52.0000 | 20.0000 |
| 106 | 1.0000 | 65.0000 | 30.0000 | 55.0000 | 18.0000 |
| 107 | 1.0000 | 58.0000 | 27.0000 | 51.0000 | 19.0000 |
| 108 | 1.0000 | 68.0000 | 32.0000 | 59.0000 | 23.0000 |
| 109 | 1.0000 | 62.0000 | 34.0000 | 54.0000 | 23.0000 |
| 110 | 1.0000 | 77.0000 | 38.0000 | 67.0000 | 22.0000 |
| 111 | 1.0000 | 67.0000 | 33.0000 | 57.0000 | 25.0000 |
| 112 | 1.0000 | 76.0000 | 30.0000 | 66.0000 | 21.0000 |
| 113 | 1.0000 | 49.0000 | 25.0000 | 45.0000 | 17.0000 |
| 114 | 1.0000 | 67.0000 | 30.0000 | 52.0000 | 23.0000 |
| 115 | 1.0000 | 59.0000 | 30.0000 | 51.0000 | 18.0000 |
| 116 | 1.0000 | 63.0000 | 25.0000 | 50.0000 | 19.0000 |
| 117 | 1.0000 | 64.0000 | 32.0000 | 53.0000 | 23.0000 |
| 118 | 1.0000 | 79.0000 | 38.0000 | 64.0000 | 20.0000 |
| 119 | 1.0000 | 67.0000 | 33.0000 | 57.0000 | 21.0000 |
| 120 | 1.0000 | 77.0000 | 28.0000 | 67.0000 | 20.0000 |
| 121 | 1.0000 | 63.0000 | 27.0000 | 49.0000 | 18.0000 |
| 122 | 1.0000 | 72.0000 | 32.0000 | 60.0000 | 18.0000 |
| 123 | 1.0000 | 61.0000 | 30.0000 | 49.0000 | 18.0000 |
| 124 | 1.0000 | 61.0000 | 26.0000 | 56.0000 | 14.0000 |
| 125 | 1.0000 | 64.0000 | 28.0000 | 56.0000 | 21.0000 |
| 126 | 1.0000 | 62.0000 | 28.0000 | 48.0000 | 18.0000 |
| 127 | 1.0000 | 77.0000 | 30.0000 | 61.0000 | 23.0000 |
| 128 | 1.0000 | 63.0000 | 34.0000 | 56.0000 | 24.0000 |
| 129 | 1.0000 | 58.0000 | 27.0000 | 51.0000 | 19.0000 |
| 130 | 1.0000 | 72.0000 | 30.0000 | 58.0000 | 16.0000 |
| 131 | 1.0000 | 71.0000 | 30.0000 | 59.0000 | 21.0000 |
| 132 | 1.0000 | 64.0000 | 31.0000 | 55.0000 | 18.0000 |
| 133 | 1.0000 | 60.0000 | 30.0000 | 48.0000 | 18.0000 |
| 134 | 1.0000 | 63.0000 | 29.0000 | 56.0000 | 18.0000 |
| 135 | 1.0000 | 77.0000 | 26.0000 | 69.0000 | 23.0000 |
| 136 | 1.0000 | 60.0000 | 22.0000 | 50.0000 | 15.0000 |
| 137 | 1.0000 | 69.0000 | 32.0000 | 57.0000 | 23.0000 |
| 138 | 1.0000 | 74.0000 | 28.0000 | 61.0000 | 19.0000 |
| 139 | 1.0000 | 56.0000 | 28.0000 | 49.0000 | 20.0000 |
| 140 | 1.0000 | 73.0000 | 29.0000 | 63.0000 | 18.0000 |
| 141 | 1.0000 | 67.0000 | 25.0000 | 58.0000 | 18.0000 |
| 142 | 1.0000 | 65.0000 | 30.0000 | 58.0000 | 22.0000 |
| 143 | 1.0000 | 69.0000 | 31.0000 | 54.0000 | 21.0000 |
| 144 | 1.0000 | 72.0000 | 36.0000 | 61.0000 | 25.0000 |
| 145 | 1.0000 | 65.0000 | 32.0000 | 51.0000 | 20.0000 |
| 146 | 1.0000 | 64.0000 | 27.0000 | 53.0000 | 19.0000 |
| 147 | 1.0000 | 68.0000 | 30.0000 | 55.0000 | 21.0000 |
| 148 | 1.0000 | 57.0000 | 25.0000 | 50.0000 | 20.0000 |
| 149 | 1.0000 | 58.0000 | 28.0000 | 51.0000 | 24.0000 |
| 150 | 1.0000 | 63.0000 | 33.0000 | 60.0000 | 25.0000 |

FIGURE 4-C

S-SPACE ASSOCIATED WITH THE GIVEN DATA.

|    | 1      | 2       | 3       | 4       | 5       |
|----|--------|---------|---------|---------|---------|
| 1  | 1.0000 | -0.6111 | 0.0833  | -0.8644 | -0.9167 |
| 2  | 1.0000 | -0.8333 | 0.1667  | -0.8644 | -0.8333 |
| 3  | 1.0000 | -0.8333 | 0.3333  | -1.0000 | -0.9167 |
| 4  | 1.0000 | -0.5556 | 0.0833  | -0.7627 | -0.6667 |
| 5  | 1.0000 | -0.3333 | 0.2500  | -0.8983 | -0.9167 |
| 6  | 1.0000 | -0.7222 | -0.0833 | -0.7966 | -0.9167 |
| 7  | 1.0000 | -0.5000 | 0.1667  | -0.8644 | -0.9167 |
| 8  | 1.0000 | -0.6667 | 0.3333  | -0.8644 | -1.0000 |
| 9  | 1.0000 | -0.9444 | 0.0000  | -0.8983 | -0.9167 |
| 10 | 1.0000 | -0.6111 | 0.2500  | -0.7966 | -0.5833 |
| 11 | 1.0000 | -0.9444 | -0.1667 | -0.8983 | -0.9167 |
| 12 | 1.0000 | -0.7778 | 0.0000  | -0.7966 | -0.9167 |
| 13 | 1.0000 | -0.7222 | -0.1667 | -0.8644 | -0.8333 |
| 14 | 1.0000 | -0.5556 | 0.5000  | -0.7966 | -0.9167 |
| 15 | 1.0000 | -0.7222 | 0.1667  | -0.6949 | -0.9167 |
| 16 | 1.0000 | -0.6111 | -0.1667 | -0.7966 | -0.9167 |
| 17 | 1.0000 | -0.6111 | 0.0000  | -0.9322 | -0.9167 |
| 18 | 1.0000 | -1.0000 | -0.1667 | -0.9661 | -1.0000 |
| 19 | 1.0000 | -0.1667 | 0.6667  | -0.9322 | -0.9167 |
| 20 | 1.0000 | -0.5556 | 0.5000  | -0.6949 | -0.7500 |
| 21 | 1.0000 | -0.6667 | -0.1667 | -0.8644 | -0.9167 |
| 22 | 1.0000 | -0.5556 | 0.2500  | -0.8644 | -0.9167 |
| 23 | 1.0000 | -0.6111 | 0.1667  | -0.7966 | -0.7500 |
| 24 | 1.0000 | -0.8333 | 0.0000  | -0.8644 | -0.9167 |
| 25 | 1.0000 | -0.2222 | 1.0000  | -0.8305 | -0.7500 |
| 26 | 1.0000 | -0.6111 | 0.3333  | -0.8644 | -0.9167 |
| 27 | 1.0000 | -0.3889 | 0.1667  | -0.8305 | -0.7500 |
| 28 | 1.0000 | -0.5000 | 0.7500  | -0.8305 | -1.0000 |
| 29 | 1.0000 | -0.3333 | 0.8333  | -0.8644 | -0.9167 |
| 30 | 1.0000 | -0.6667 | -0.0833 | -0.8305 | -0.9167 |
| 31 | 1.0000 | -0.3889 | 0.5833  | -0.7627 | -0.7500 |
| 32 | 1.0000 | -0.6111 | 0.1667  | -0.8305 | -0.9167 |
| 33 | 1.0000 | -0.9444 | -0.2500 | -0.8644 | -0.9167 |
| 34 | 1.0000 | -0.7778 | 0.0000  | -0.8983 | -0.9167 |
| 35 | 1.0000 | -0.8333 | -0.0833 | -0.8305 | -0.9167 |
| 36 | 1.0000 | -0.5556 | 0.1667  | -0.8305 | -0.9167 |
| 37 | 1.0000 | -0.6111 | 0.2500  | -0.8983 | -0.8333 |
| 38 | 1.0000 | -0.6667 | -0.0833 | -0.8305 | -1.0000 |
| 39 | 1.0000 | -0.3889 | 0.4167  | -0.8305 | -0.9167 |
| 40 | 1.0000 | -0.3889 | 0.5833  | -0.8983 | -0.7500 |
| 41 | 1.0000 | -0.5556 | 0.2500  | -0.8644 | -0.8333 |

FIGURE 5-A

| | | | | | |
|---|---|---|---|---|---|
| 42 | 1.0000 | -0.7222 | 0.1667 | -0.7966 | -0.9167 |
| 43 | 1.0000 | -0.7222 | -0.1667 | -0.8644 | -1.0000 |
| 44 | 1.0000 | -0.8889 | -0.7500 | -0.8983 | -0.8333 |
| 45 | 1.0000 | -0.2222 | 0.5000 | -0.7627 | -0.8333 |
| 46 | 1.0000 | -0.5556 | 0.5000 | -0.8305 | -0.8333 |
| 47 | 1.0000 | -0.3889 | 0.1667 | -0.7627 | -0.9167 |
| 48 | 1.0000 | -0.5556 | 0.4167 | -0.8305 | -0.7500 |
| 49 | 1.0000 | -0.5000 | 0.2500 | -0.8305 | -0.9167 |
| 50 | 1.0000 | -0.4444 | 0.4167 | -0.8305 | -0.9167 |
| 51 | 1.0000 | 0.2222 | -0.3333 | 0.2203 | 0.1667 |
| 52 | 1.0000 | 0.0556 | -0.8333 | 0.1864 | 0.1667 |
| 53 | 1.0000 | -0.1111 | 0.0000 | 0.2881 | 0.4167 |
| 54 | 1.0000 | 0.0000 | -0.1667 | 0.2203 | 0.0833 |
| 55 | 1.0000 | -0.0556 | -0.4167 | 0.3898 | 0.2500 |
| 56 | 1.0000 | -0.2778 | -0.5833 | -0.0169 | -0.1667 |
| 57 | 1.0000 | -0.2222 | -0.3333 | 0.1864 | 0.0000 |
| 58 | 1.0000 | 0.1111 | 0.0833 | 0.2542 | 0.2500 |
| 59 | 1.0000 | 0.5000 | 0.0000 | 0.2542 | 0.0833 |
| 60 | 1.0000 | 0.1667 | 0.0000 | 0.1864 | 0.1667 |
| 61 | 1.0000 | 0.0000 | -0.3333 | 0.0169 | 0.0000 |
| 62 | 1.0000 | -0.3333 | -0.6667 | -0.0508 | -0.1667 |
| 63 | 1.0000 | -0.3889 | -0.1667 | 0.1864 | 0.1667 |
| 64 | 1.0000 | -0.1667 | -0.5000 | 0.0169 | -0.0833 |
| 65 | 1.0000 | -0.3333 | -0.5000 | 0.1525 | -0.0833 |
| 66 | 1.0000 | 0.3333 | -0.0833 | 0.1525 | 0.0833 |
| 67 | 1.0000 | -0.2778 | -0.1667 | 0.1864 | 0.1667 |
| 68 | 1.0000 | -0.1667 | -0.4167 | 0.0508 | -0.2500 |
| 69 | 1.0000 | -0.0556 | -0.2500 | 0.1864 | 0.1667 |
| 70 | 1.0000 | -0.2222 | -0.5000 | -0.1525 | -0.2500 |
| 71 | 1.0000 | -0.2222 | -0.2500 | 0.0847 | 0.0000 |
| 72 | 1.0000 | -0.6667 | -0.6667 | -0.2203 | -0.2500 |
| 73 | 1.0000 | -0.2778 | -0.4167 | 0.0847 | 0.0000 |
| 74 | 1.0000 | -0.2222 | -0.1667 | 0.0847 | -0.0833 |
| 75 | 1.0000 | 0.2778 | -0.2500 | 0.2203 | 0.0000 |
| 76 | 1.0000 | -0.5000 | -0.4167 | -0.0169 | 0.0833 |
| 77 | 1.0000 | -0.0556 | 0.1667 | 0.1864 | 0.2500 |
| 78 | 1.0000 | -0.6111 | -1.0000 | -0.1525 | -0.2500 |
| 79 | 1.0000 | -0.3333 | -0.6667 | -0.0847 | -0.2500 |
| 80 | 1.0000 | -0.1667 | -0.4167 | -0.0169 | -0.0833 |
| 81 | 1.0000 | 0.0556 | -0.2500 | 0.1186 | 0.0000 |
| 82 | 1.0000 | -0.1111 | -0.1667 | 0.0847 | 0.1667 |
| 83 | 1.0000 | -0.0556 | -0.8333 | 0.0169 | -0.2500 |
| 84 | 1.0000 | 0.3333 | -0.0833 | 0.2542 | 0.1667 |
| 85 | 1.0000 | 0.1111 | -0.7500 | 0.1525 | 0.0000 |
| 86 | 1.0000 | -0.2778 | -0.1667 | 0.0508 | 0.0000 |
| 87 | 1.0000 | 0.1111 | -0.5833 | 0.3220 | 0.1667 |
| 88 | 1.0000 | 0.0000 | -0.3333 | 0.2542 | -0.0833 |
| 89 | 1.0000 | 0.1667 | -0.2500 | 0.1186 | 0.0000 |

FIGURE 5-B

| | | | | | |
|---|---|---|---|---|---|
| 90 | 1.0000 | -0.5556 | -0.5833 | -0.3220 | -0.1667 |
| 91 | 1.0000 | -0.2222 | -0.3333 | 0.0508 | 0.0000 |
| 92 | 1.0000 | 0.0000 | -0.2500 | 0.2542 | 0.0833 |
| 93 | 1.0000 | -0.2778 | -0.2500 | -0.1186 | 0.0000 |
| 94 | 1.0000 | 0.4444 | -0.0833 | 0.3220 | 0.1667 |
| 95 | 1.0000 | -0.3333 | -0.5833 | 0.0169 | 0.0000 |
| 96 | 1.0000 | -0.3333 | -0.7500 | 0.0169 | 0.0000 |
| 97 | 1.0000 | 0.2778 | -0.1667 | 0.1525 | 0.0833 |
| 98 | 1.0000 | 0.3889 | -0.3333 | 0.2881 | 0.0833 |
| 99 | 1.0000 | 0.3333 | -0.1667 | 0.3559 | 0.3333 |
| 100 | 1.0000 | 0.2778 | -0.2500 | 0.3220 | 0.2500 |
| 101 | 1.0000 | 0.1667 | -0.3333 | 0.5593 | 0.7500 |
| 102 | 1.0000 | 0.3333 | -0.0833 | 0.5593 | 0.9167 |
| 103 | 1.0000 | 0.1111 | -0.3333 | 0.3898 | 0.1667 |
| 104 | 1.0000 | 0.4444 | -0.0833 | 0.3898 | 0.8333 |
| 105 | 1.0000 | 0.2222 | -0.1667 | 0.4237 | 0.5833 |
| 106 | 1.0000 | 0.2222 | -0.1667 | 0.5254 | 0.4167 |
| 107 | 1.0000 | -0.1667 | -0.4167 | 0.3898 | 0.5000 |
| 108 | 1.0000 | 0.3889 | 0.0000 | 0.6610 | 0.8333 |
| 109 | 1.0000 | 0.0556 | 0.1667 | 0.4915 | 0.8333 |
| 110 | 1.0000 | 0.8889 | 0.5000 | 0.9322 | 0.7500 |
| 111 | 1.0000 | 0.3333 | 0.0833 | 0.5932 | 1.0000 |
| 112 | 1.0000 | 0.8333 | -0.1667 | 0.8983 | 0.6667 |
| 113 | 1.0000 | -0.6667 | -0.5833 | 0.1864 | 0.3333 |
| 114 | 1.0000 | 0.3333 | -0.1667 | 0.4237 | 0.8333 |
| 115 | 1.0000 | -0.1111 | -0.1667 | 0.3898 | 0.4167 |
| 116 | 1.0000 | 0.1111 | -0.5833 | 0.3559 | 0.5000 |
| 117 | 1.0000 | 0.1667 | 0.0000 | 0.4576 | 0.8333 |
| 118 | 1.0000 | 1.0000 | 0.5000 | 0.8305 | 0.5833 |
| 119 | 1.0000 | 0.3333 | 0.0833 | 0.5932 | 0.6667 |
| 120 | 1.0000 | 0.8889 | -0.3333 | 0.9322 | 0.5833 |
| 121 | 1.0000 | 0.1111 | -0.4167 | 0.3220 | 0.4167 |
| 122 | 1.0000 | 0.6111 | 0.0000 | 0.6949 | 0.4167 |
| 123 | 1.0000 | 0.0000 | -0.1667 | 0.3220 | 0.4167 |
| 124 | 1.0000 | 0.0000 | -0.5000 | 0.5593 | 0.0833 |
| 125 | 1.0000 | 0.1667 | -0.3333 | 0.5593 | 0.6667 |
| 126 | 1.0000 | 0.0556 | -0.3333 | 0.2881 | 0.4167 |
| 127 | 1.0000 | 0.8889 | -0.1667 | 0.7288 | 0.8333 |
| 128 | 1.0000 | 0.1111 | 0.1667 | 0.5593 | 0.9167 |
| 129 | 1.0000 | -0.1667 | -0.4167 | 0.3898 | 0.5000 |
| 130 | 1.0000 | 0.6111 | -0.1667 | 0.6271 | 0.2500 |
| 131 | 1.0000 | 0.5556 | -0.1667 | 0.6610 | 0.6667 |
| 132 | 1.0000 | 0.1667 | -0.0833 | 0.5254 | 0.4167 |
| 133 | 1.0000 | -0.0556 | -0.1667 | 0.2881 | 0.4167 |
| 134 | 1.0000 | 0.1111 | -0.2500 | 0.5593 | 0.4167 |
| 135 | 1.0000 | 0.8889 | -0.5000 | 1.0000 | 0.8333 |
| 136 | 1.0000 | -0.0556 | -0.8333 | 0.3559 | 0.1667 |
| 137 | 1.0000 | 0.4444 | 0.0000 | 0.5932 | 0.8333 |

FIGURE 5-C

| | | | | | |
|---|---|---|---|---|---|
| 138 | 1.0000 | 0.7222 | -0.3333 | 0.7288 | 0.5000 |
| 139 | 1.0000 | -0.2778 | -0.3333 | 0.3220 | 0.5833 |
| 140 | 1.0000 | 0.6667 | -0.2500 | 0.7966 | 0.4167 |
| 141 | 1.0000 | 0.3333 | -0.5833 | 0.6271 | 0.4167 |
| 142 | 1.0000 | 0.2222 | -0.1667 | 0.6271 | 0.7500 |
| 143 | 1.0000 | 0.4444 | -0.0833 | 0.4915 | 0.6667 |
| 144 | 1.0000 | 0.6111 | 0.3333 | 0.7288 | 1.0000 |
| 145 | 1.0000 | 0.2222 | 0.0000 | 0.3898 | 0.5833 |
| 146 | 1.0000 | 0.1667 | -0.4167 | 0.4576 | 0.5000 |
| 147 | 1.0000 | 0.3889 | -0.1667 | 0.5254 | 0.6667 |
| 148 | 1.0000 | -0.2222 | -0.5833 | 0.3559 | 0.5833 |
| 149 | 1.0000 | -0.1667 | -0.3333 | 0.3898 | 0.9167 |
| 150 | 1.0000 | 0.1111 | 0.0833 | 0.6949 | 1.0000 |

FIGURE 5-D

TRANSPOSED S-SPACE.

| 1/ | 2/ | 3/ | 4/ | 5/ | 6/ | 7/ | 8/ | 9/ | 10/ |
|---|---|---|---|---|---|---|---|---|---|
| 11/ | 12/ | 13/ | 14/ | 15/ | 16/ | 17/ | 18/ | 19/ | 20/ |
| 21/ | 22/ | 23/ | 24/ | 25/ | 26/ | 27/ | 28/ | 29/ | 30/ |
| 31/ | 32/ | 33/ | 34/ | 35/ | 36/ | 37/ | 38/ | 39/ | 40/ |
| 41/ | 42/ | 43/ | 44/ | 45/ | 46/ | 47/ | 48/ | 49/ | 50/ |
| 51/ | 52/ | 53/ | 54/ | 55/ | 56/ | 57/ | 58/ | 59/ | 60/ |
| 61/ | 62/ | 63/ | 64/ | 65/ | 66/ | 67/ | 68/ | 69/ | 70/ |
| 71/ | 72/ | 73/ | 74/ | 75/ | 76/ | 77/ | 78/ | 79/ | 80/ |
| 81/ | 82/ | 83/ | 84/ | 85/ | 86/ | 87/ | 88/ | 89/ | 90/ |
| 91/ | 92/ | 93/ | 94/ | 95/ | 96/ | 97/ | 98/ | 99/ | 100/ |
| 101/ | 102/ | 103/ | 104/ | 105/ | 106/ | 107/ | 108/ | 109/ | 110/ |
| 111/ | 112/ | 113/ | 114/ | 115/ | 116/ | 117/ | 118/ | 119/ | 120/ |
| 121/ | 122/ | 123/ | 124/ | 125/ | 126/ | 127/ | 128/ | 129/ | 130/ |
| 131/ | 132/ | 133/ | 134/ | 135/ | 136/ | 137/ | 138/ | 139/ | 140/ |
| 141/ | 142/ | 143/ | 144/ | 145/ | 146/ | 147/ | 148/ | 149/ | 150/ |
| 1.0000 | 1.0000 | 1.0000 | 1.0000 | 1.0000 | 1.0000 | 1.0000 | 1.0000 | 1.0000 | 1.0000 |
| 1.0000 | 1.0000 | 1.0000 | 1.0000 | 1.0000 | 1.0000 | 1.0000 | 1.0000 | 1.0000 | 1.0000 |

FIGURE 6-A

| 1.0000 | 1.0000 | 1.0000 | 1.0000 | 1.0000 | 1.0000 | 1.0000 | 1.0000 | 1.0000 | 1.0000 | 1.0000 |
|---|---|---|---|---|---|---|---|---|---|---|
| 1.0000 | 1.0000 | 1.0000 | 1.0000 | 1.0000 | 1.0000 | 1.0000 | 1.0000 | 1.0000 | 1.0000 | 1.0000 |
| 1.0000 | 1.0000 | 1.0000 | 1.0000 | 1.0000 | 1.0000 | 1.0000 | 1.0000 | 1.0000 | 1.0000 | 1.0000 |
| 1.0000 | 1.0000 | 1.0000 | 1.0000 | 1.0000 | 1.0000 | 1.0000 | 1.0000 | 1.0000 | 1.0000 | 1.0000 |
| 1.0000 | 1.0000 | 1.0000 | 1.0000 | 1.0000 | 1.0000 | 1.0000 | 1.0000 | 1.0000 | 1.0000 | 1.0000 |
| 1.0000 | 1.0000 | 1.0000 | 1.0000 | 1.0000 | 1.0000 | 1.0000 | 1.0000 | 1.0000 | 1.0000 | 1.0000 |
| 1.0000 | 1.0000 | 1.0000 | 1.0000 | 1.0000 | 1.0000 | 1.0000 | 1.0000 | 1.0000 | 1.0000 | 1.0000 |
| 1.0000 | 1.0000 | 1.0000 | 1.0000 | 1.0000 | 1.0000 | 1.0000 | 1.0000 | 1.0000 | 1.0000 | 1.0000 |
| 1.0000 | 1.0000 | 1.0000 | 1.0000 | 1.0000 | 1.0000 | 1.0000 | 1.0000 | 1.0000 | 1.0000 | 1.0000 |
| 1.0000 | 1.0000 | 1.0000 | 1.0000 | 1.0000 | 1.0000 | 1.0000 | 1.0000 | 1.0000 | 1.0000 | 1.0000 |
| 1.0000 | 1.0000 | 1.0000 | 1.0000 | 1.0000 | 1.0000 | 1.0000 | 1.0000 | 1.0000 | 1.0000 | 1.0000 |

| | | | | | | | |
|---|---|---|---|---|---|---|---|
| 3 | 0.0833 | 0.1667 | 0.3333 | 0.0833 | 0.0833 | 0.1667 | 0.2500 |
| | 0.1667 | 0.0000 | 0.1667 | 0.5000 | 0.1667 | 0.0000 | 0.5000 |
| | 0.1667 | 0.2500 | 0.1667 | 0.0000 | 0.1667 | 0.1667 | 0.0833 |
| | 0.5833 | 0.1667 | -0.2500 | 0.0000 | 0.1667 | 0.2500 | 0.5833 |
| | 0.2500 | 0.1667 | 0.1667 | -0.0833 | 0.1667 | -0.0833 | 0.4167 |
| | 0.2500 | 0.1667 | 0.7500 | 1.0000 | 0.3333 | 0.1667 | 0.7500 |
| | 0.3333 | 0.0000 | 0.1667 | 0.1667 | 0.1667 | 0.0000 | 0.0833 |
| | 0.3333 | 0.6667 | 0.5000 | 0.2500 | 0.2500 | 0.1667 | 0.0000 |
| | 0.3333 | 0.1667 | 0.5000 | 0.5000 | 0.0833 | 0.1667 | 0.5000 |
| | 0.2500 | 0.6667 | 0.7500 | 0.2500 | 0.4167 | 0.2500 | 0.4167 |
| | 0.2500 | 0.4167 | 0.2500 | 0.1667 | 0.1667 | 0.1667 | 0.2500 |
| | 0.1667 | 0.8333 | 0.1667 | 0.4167 | 0.1667 | 0.6667 | 0.4167 |
| | 0.4167 | 0.2500 | 0.0833 | 0.1667 | 0.1667 | 0.2500 | 0.5833 |
| | 0.0833 | 0.5833 | 0.1667 | 0.5833 | 0.0000 | 1.0000 | 0.0000 |
| | 0.3333 | 0.3333 | 0.0833 | 0.1667 | 0.4167 | 0.4167 | 0.0000 |
| | 0.3333 | 0.2500 | 0.0833 | 0.3333 | 0.0000 | 0.0833 | 0.1667 |
| | 0.1667 | 0.5000 | 0.1667 | 0.3333 | 0.5000 | 0.1667 | 0.2500 |
| | 0.0833 | 0.1667 | 0.5000 | 0.3333 | 0.0000 | 0.3333 | 0.3333 |
| | 0.5833 | 0.1667 | 0.3333 | 0.0000 | 0.1667 | 0.5833 | 0.0833 |
| 4 | -0.8644 | -1.0000 | -0.7627 | -0.8983 | -0.8644 | -0.8983 | -0.7966 |
| | -0.8983 | -0.7966 | -0.8644 | -0.6949 | -0.9322 | -0.9661 | -0.6949 |
| | -0.8644 | -0.8644 | -0.7966 | -0.8305 | -0.8305 | -0.9322 | -0.8305 |
| | -0.7627 | -0.8305 | -0.8644 | -0.8305 | -0.8305 | -0.8305 | -0.8983 |
| | -0.8644 | -0.7966 | -0.8983 | -0.7627 | -0.8983 | -0.8305 | -0.8305 |
| | 0.2203 | 0.1864 | 0.2881 | 0.2203 | 0.3898 | -0.0169 | 0.1864 | 0.2542 | 0.2542 | 0.1864 |

| | | | | | | |
|---|---|---|---|---|---|---|
| -0.7627 | -0.8305 | -0.8644 | -0.8983 | -0.8305 | -0.8305 | -0.8983 |
| -0.8644 | -0.7966 | -0.8644 | -0.8983 | -0.7627 | -0.8305 | -0.8305 |
| 0.2203 | 0.1864 | 0.2881 | 0.2203 | 0.3898 | 0.1864 | 0.1864 |
| 0.0169 | -0.0508 | 0.1864 | 0.0169 | 0.1525 | 0.1864 | -0.1525 |
| 0.0847 | -0.2203 | 0.0847 | 0.2203 | -0.0169 | 0.0508 | -0.0169 |
| 0.1186 | 0.0847 | 0.0169 | 0.1525 | 0.3220 | -0.1525 | -0.3220 |
| 0.0508 | -0.1186 | 0.3220 | 0.0169 | 0.1525 | 0.2881 | 0.3220 |
| 0.5593 | 0.2542 | 0.4237 | 0.5254 | 0.3898 | 0.3559 | 0.9322 |
| 0.5932 | 0.3898 | 0.4237 | 0.3898 | 0.4576 | 0.5932 | 0.9322 |
| 0.5593 | 0.8983 | 0.1864 | 0.5593 | 0.2881 | 0.8305 | 0.6271 |
| 0.3220 | 0.6949 | 0.3220 | 1.0000 | 0.7288 | 0.5593 | 0.7966 |
| 0.6610 | 0.5254 | 0.2881 | 0.5593 | 0.5932 | 0.3220 | 0.6271 |
| -0.8333 | -1.0000 | -0.8333 | -0.8333 | -0.7500 | -1.0000 | -0.9167 |
| 0.1667 | 0.4167 | 0.0833 | 0.2500 | 0.0000 | 0.0833 | 0.1667 |
| 0.0000 | 0.1667 | -0.0833 | -0.1667 | 0.1667 | 0.1667 | -0.2500 |
| 0.0000 | -0.1667 | -0.0833 | 0.0000 | 0.1667 | -0.2500 | -0.2500 |
| 0.0000 | 0.0000 | 0.0000 | 0.0000 | 0.2500 | 0.1667 | -0.0833 |
| 0.0000 | 0.0000 | 0.0833 | 0.0833 | -0.2500 | -0.2500 | 0.1667 |
| -0.7500 | -0.9167 | -0.7500 | -0.9167 | -1.0000 | 0.0000 | -0.0833 |
| -0.9167 | -0.9167 | -0.9167 | -0.9167 | -1.0000 | -0.9167 | -0.7500 |
| -0.9167 | -0.8333 | -0.7500 | -0.7500 | -1.0000 | -0.9167 | -0.9167 |
| -0.9167 | -0.9167 | -0.9167 | -0.9167 | -0.8333 | -0.9167 | -0.9167 |
| 0.6271 | 0.4915 | 0.7288 | 0.3898 | 0.5254 | 0.3559 | 0.6949 |
| 0.7500 | 0.9167 | 0.1667 | 0.8333 | 0.5833 | 0.8333 | 0.7500 |

FIGURE 6-E

| 1.0000 | 0.6667 | 0.3333 | 0.8333 | 0.4167 | 0.5000 | 0.8333 | 0.5833 | 0.6667 | 0.5833 |
| 0.4167 | 0.4167 | 0.4167 | 0.0833 | 0.6667 | 0.4167 | 0.8333 | 0.9167 | 0.5000 | 0.2500 |
| 0.6667 | 0.4167 | 0.4167 | 0.4167 | 0.8333 | 0.1667 | 0.8333 | 0.5000 | 0.5833 | 0.4167 |
| 0.4167 | 0.7500 | 0.6667 | 1.0000 | 0.5833 | 0.5000 | 0.6667 | 0.5833 | 0.9167 | 1.0000 |

FIGURE 6-F

FIGURE 7. BOUNDARIES OF THE OPS FOR FISCHER IRIS DATA EXAMPLE

DIMENSION # 1 LOWEST LIMIT = -0.13194 HIGHEST LIMIT = 1.83352 MEAN = 0.89589 ST. DEV = 0.56925

DIMENSION # 2 LOWEST LIMIT = -0.72764 HIGHEST LIMIT = 1.89081 MEAN = 0.48909 ST. DEV = 0.78226

DIMENSION # 3 LOWEST LIMIT = -1.02502 HIGHEST LIMIT = 0.95728 MEAN = -0.02160 ST. DEV = 0.34934

DIMENSION # 4 LOWEST LIMIT = -0.52824 HIGHEST LIMIT = 0.46476 MEAN = 0.00055 ST. DEV = 0.19635

DIMENSION # 5 LOWEST LIMIT = -0.27787 HIGHEST LIMIT = 0.26868 MEAN = 0.00009 ST. DEV = 0.08403

FIGURE 9. $D_{OPS}$ AT EXTREMES OF EACH DIMENSION

| | EXTREME | |
|---|---|---|
| | LOWEST | HIGHEST |
| DIMENSION # 1 | 0.0541 | 0.0314 |
| DIMENSION # 2 | 0.0309 | 0.0541 |
| DIMENSION # 3 | 0.0728 | 0.0604 |
| DIMENSION # 4 | 0.0836 | 0.0651 |
| DIMENSION # 5 | 0.0933 | 0.0899 |

CROSS-VALIDATION $D_{OPS}$

| | | | | | |
|---|---|---|---|---|---|
| 1 | 0.0197 | 11 | 0.0284 | 21 | 0.0261 |
| 2 | 0.0259 | 12 | 0.0234 | 22 | 0.0210 |
| 3 | 0.0309 | 13 | 0.0270 | 23 | 0.0186 |
| 4 | 0.0217 | 14 | 0.0365 | 24 | 0.0227 |
| 5 | 0.0424 | 15 | 0.0423 | 25 | 0.0728 |
| 6 | 0.0202 | 16 | 0.0233 | 26 | 0.0232 |
| 7 | 0.0234 | 17 | 0.0297 | 27 | 0.0374 |
| 8 | 0.0298 | 18 | 0.0314 | 28 | 0.0631 |
| 9 | 0.0292 | 19 | 0.0656 | 29 | 0.0557 |
| 10 | 0.0316 | 20 | 0.0368 | 30 | 0.0202 |
| 31 | 0.0329 | 41 | 0.0222 | 51 | 0.0201 |
| 32 | 0.0190 | 42 | 0.0253 | 52 | 0.0568 |
| 33 | 0.0300 | 43 | 0.0245 | 53 | 0.0286 |
| 34 | 0.0208 | 44 | 0.0853 | 54 | 0.0146 |
| 35 | 0.0234 | 45 | 0.0370 | 55 | 0.0238 |
| 36 | 0.0194 | 46 | 0.0298 | 56 | 0.0219 |
| 37 | 0.0238 | 47 | 0.0243 | 57 | 0.0291 |
| 38 | 0.0228 | 48 | 0.0263 | 58 | 0.0152 |
| 39 | 0.0287 | 49 | 0.0214 | 59 | 0.0362 |
| 40 | 0.0455 | 50 | 0.0269 | 60 | 0.0108 |
| 61 | 0.0158 | 71 | 0.0148 | 81 | 0.0110 |
| 62 | 0.0263 | 72 | 0.0369 | 82 | 0.0096 |
| 63 | 0.0485 | 73 | 0.0170 | 83 | 0.0579 |
| 64 | 0.0162 | 74 | 0.0248 | 84 | 0.0185 |
| 65 | 0.0405 | 75 | 0.0248 | 85 | 0.0508 |
| 66 | 0.0251 | 76 | 0.0285 | 86 | 0.0180 |
| 67 | 0.0301 | 77 | 0.0254 | 87 | 0.0228 |
| 68 | 0.0292 | 78 | 0.0604 | 88 | 0.0369 |
| 69 | 0.0089 | 79 | 0.0285 | 89 | 0.0173 |
| 70 | 0.0212 | 80 | 0.0126 | 90 | 0.0401 |

FIGURE 8-A

| | | | | | |
|---|---|---|---|---|---|
| 91 | 0.0111 | 101 | 0.0238 | 111 | 0.0567 |
| 92 | 0.0171 | 102 | 0.0467 | 112 | 0.0470 |
| 93 | 0.0138 | 103 | 0.0228 | 113 | 0.0758 |
| 94 | 0.0266 | 104 | 0.0899 | 114 | 0.0673 |
| 95 | 0.0208 | 105 | 0.0184 | 115 | 0.0301 |
| 96 | 0.0319 | 106 | 0.0198 | 116 | 0.0340 |
| 97 | 0.0220 | 107 | 0.0269 | 117 | 0.0461 |
| 98 | 0.0344 | 108 | 0.0275 | 118 | 0.0957 |
| 99 | 0.0160 | 109 | 0.0582 | 119 | 0.0261 |
| 100 | 0.0153 | 110 | 0.0938 | 120 | 0.0651 |
| 121 | 0.0188 | 131 | 0.0228 | 141 | 0.0289 |
| 122 | 0.0461 | 132 | 0.0285 | 142 | 0.0224 |
| 123 | 0.0143 | 133 | 0.0166 | 143 | 0.0299 |
| 124 | 0.0933 | 134 | 0.0305 | 144 | 0.0563 |
| 125 | 0.0179 | 135 | 0.0541 | 145 | 0.0218 |
| 126 | 0.0164 | 136 | 0.0369 | 146 | 0.0150 |
| 127 | 0.0709 | 137 | 0.0337 | 147 | 0.0228 |
| 128 | 0.0617 | 138 | 0.0443 | 148 | 0.0393 |
| 129 | 0.0269 | 139 | 0.0430 | 149 | 0.0836 |
| 130 | 0.0538 | 140 | 0.0572 | 150 | 0.0667 |

FIGURE 8-B

PSS BETWEEN MALATHION (121-7[5) AND MALAOXON (1634-78-2)
FOR MALE MOUSE CARCINOGENICLTY

DESCRIPTOR

| CODE | COEFF $W_1$ | NAME | VALUE 1634-78-2 $P^T_1$ | 121-75-5 $P^Q_1$ |
|---|---|---|---|---|
| EG0753 | - 2.9640 | [CH2*] * [ALPHATIC S] | 0.0000 | 0.0000 |
| EG19 | -39.1643 | [:C(=*):] | 0.0000 | 0.0000 |
| EG2053 | -10.8230 | [ALIPHATIC N] * [ALIPHATIC S] | 0.0000 | 0.0000 |
| ES1219 | 5.8833 | [=C<] - [:C(-):] | 0.0000 | 0.0000 |
| PF1A43 | -0.6188 | [:C(@):] @ ] @ [@O@] | 0.0000 | 0.0000 |
| PF1B3C | 2.1303 | [:C(:):] : [:n:] | 0.0000 | 0.0000 |
| PG0526 | -0.9520 | [ALIPHATIC C] * [ [N ) | 0.0000 | 0.0000 |
| PG0547 | 0.6642 | [ALIPHATIC C] * [-OH] | 0.0000 | 0.0000 |
| PG06 | -8024 | [-CH3] | 5.6840 | 6.1940 |
| PG0622 | 3.7892 | [-CH3] [ * [NH[ ] | 0.0000 | 0.0000 |
| PG0747 | -0.7146 | [*CH2*] * [-OH] | 0.0000 | 0.0000 |
| PG0773 | 1.5358 | [*CH2*] * [CL, 8R, F, OR I] | 0.0000 | 0.0000 |
| PG0976 | -2.4260 | [*CH(*)*] * [BR] | 0.0000 | 0.0000 |
| PG1016 | -7.8273 | [*CH=*] * [AROMATIC C] | 0.0000 | 0.0000 |
| PG1020 | -5.0175 | [*CH=[] * [ALIPHATIC N] | 0.0000 | 0.0000 |
| PG1212 | -3.3670 | [*C(*)(*)] * [*C(*)(*)] | 0.0000 | 0.0000 |
| PG1618 | 0.2034 | [AROMATIC C] : [:C(*):] | 0.0000 | 0.0000 |
| PG1624 | -1.8408 | [AROMATIC C] * [*N(*)*] | 0.0000 | 0.0000 |
| PG1648 | 0.8359 | [AROMATIC C) * [*0[*] | 0.0000 | 0.0000 |
| PG1651 | 2.2684 | [AROMATIC C] * [O] | 0.0000 | 0.0000 |
| PG1655 | 2.6262 | [AROMATIC C] * [*S*] | 0.0000 | 0.0000 |
| PG1673 | 0.9246 | [AROMATIC C] * [CL, BR, F, OR | 0.0000 | 0.0000 |

FIGURE 10-A

| | | | | |
|---|---|---|---|---|
| PG1740 | 1.1650 | [ :CH: ] : [ AROMATIC N ] | 0.0000 | 0.0000 |
| PG2425 | -2.6157 | [ *N(*) * ] * [ *N=* ] | 0.0000 | 0.0000 |
| PN05 | 0.7207 | [ -CH2- ] | 0.0995 | 0.3529 |
| PN0861 | -0.8436 | [ >CH- ] - [ -Cl ] | 0.0000 | 0.0000 |
| PNOB12D | 10.8068 | [ =CH- ] = [ =C< ] | 0.0000 | 0.0000 |
| PNOE | -3.8683 | [ >C< ] | 0.0000 | 0.0000 |
| PROC | -6.6371 | [ @CH=@ ] | 0.0000 | 0.0000 |
| PR1320 | 2.1342 | [ =C(@)@ ] @ [ @NH[@) | 0.0000 | 0.0000 |
| PR1323 | 19.8991 | [ =C(@)(@) @ [ -N(@)[@] | 0.0000 | 0.0000 |
| PR1919 | -3.3251 | [ :C(-): ] : [ :C(-): ] | 0.0000 | 0.0000 |
| PS0809 | 3.9715 | [ >CH- ] - [ -CH(@)[ @] | 0.0000 | 0.0000 |
| QFOA | -2.3648 | [ @CH(@)[@ ] | 0.0000 | 0.0000 |
| QFOA1A | -22.6131 | [ @CH(@)[@ ] @ [ :C(@): ] | 0.0000 | 0.0000 |
| QG1316 | 5.9163 | [ *C(=*)* ] * [ AROMATIC C ] | 0.0000 | 0.0000 |
| QS0509 | -23.7832 | [ -CH2- ] - [ -CH(@) (@) ]] | 0.0000 | 0.0000 |
| QSOE19 | 5.8494 | [ >C< ] - [ :C(-): ] | 0.0000 | 0.0000 |
| VCHOD3 | -7.4616 | [ *C(=*) (*) ] | -0.7975 | -0.7975 |
| VFOA24 | 15.6855 | [ @CH(@)@ ] @ [ @N(@)@ ] | 0.0000 | 0.0000 |
| VG05 | 3.6441 | [ ALIPHATIC C ] | 0.1856 | 0.1856 |
| VG0516 | 2.7066 | [ ALIPHATIC C ] * [ AROMATIC C ] | 0.0000 | 0.0000 |
| VG0547 | -0.7721 | [ ALIPHATIC C ] * [ -OH ] | 0.0000 | 0.0000 |
| VG0746 | 1.0273 | [ *CH2* ] * [ ALIPHATLC O ] | 4.7800 | 4.7800 |
| VGO909 | 2.6259 | [ *CH(*)* ] * [ *CH(*) ] | 0.0000 | 0.0000 |
| VG0975 | 1.8364 | [ *CH(*)* ] * [ Cl ] | 0.0000 | 0.0000 |
| VG0976 | 3.6807 | [ *CH(*) * [ BR ] | 0.0000 | 0.0000 |
| VG1016 | 10.3308 | [ *CH=[ * [ AROMATIC C ] | 0.0000 | 0.0000 |
| VG16 | -2.6926 | ( AROMATIC C ] | 0.0000 | 0.0000 |
| VG1620 | 1.5960 | [ AROMATIC C ] * [ ALIPHATIC N ] | 0.0000 | 0.0000 |
| VG1627 | 11.5286 | [ AROMATIC C ] * [ ALIPHATIC N ] | 0.0000 | 0.0000 |
| VG2046 | 1.8803 | [ ALIPHATIC N ] * [ ALIPHATIC O ] | 0.0000 | 0.0000 |
| VG46 | -0.2925 | [ ALIPHATIC O ] | 7.5129 | 6.8300 |
| VR0606 | 1.9444 | [ @CH2@ ] @ [ @CH2@ ] | 0.0000 | 0.0000 |
| VR0913 | -8.5030 | [ -CH(@)@ ] @ [ =C(@)@] | 0.0000 | 0.0000 |
| VR0943 | 3.4003 | [ -CH(@)@ ] @ [ @0@ ] | 0.0000 | 0.0000 |

FIGURE 10-B

| | | | | |
|---|---|---|---|---|
| VROC | 11.7975 | [ @CH=[@] ] | 0.0000 | 0.0000 |
| VR193C | -1.2489 | [ :C(-): ] : [ :n: ] | 0.0000 | 0.0000 |
| SYM7 | 37.8523 | SYMMETRY INDEX ORDER 7 | 0.1053 | 0.1053 |
| CONST | -22.9206 | LDA CONSTANT | 1.0 | 1.0 |

---

BOND CODES:

-     -    NON-CYCLIC SINGLE BOND
-     =    NON-CYCLIC DOUBLE 80ND
-     @    CYCLIC SINGLE BOND
-     =@    CYCLIC DOUBLE BOND
-     *    ANY SINGLE BOND
-     =*    ANY DOUBLE BOND
-     #    TRIPLE BOND
-     :    AROMATIC BOND
-     ~    ANY BOND

: THE FIRST LETTERS E, P, Q, AND V IN THE CODE REFER. RESPECTIVELY, TO PLAIN E- VALUE$^3$, QUANTUM NUMBER ADJUSTED E-VALUES$^3$, THE COUNT, AND THE RATIO OF PLAIN E-VALUE TO THE COUNT OF THE CORRESPONDING FRAGMENT DESCRIBED IN THE COLUMN NAME.

FIGURE 10-C

PSS BETWEEN MALATHION (121-75-5) AND MALAOXON
(1634-78-2) FOR FEMALE RAT CARCINOGENICITY

DESCRIPTOR

| CODE | COEFF W1 | NAME | 1634-78-2 PT1 | 121-75-5 PQ1 |
|---|---|---|---|---|
| EF131A | -18.2008 | [ =C(@) @ ] @ [ :C(@) : ] | 0.0000 | 0.0000 |
| EG0616 | 2.8960 | [ -CH3 ] * [ AROMATIC C ] | 0.0000 | 0.0000 |
| EG0620 | 1.0534 | [ -CH3 ] * [ ALIPHATIC N ] | 0.0000 | 0.0000 |
| EG0709 | 0.7680 | [ *CH2* ] * [ *CH(*)* ] | -1.9740 | -1.9740 |
| EG0773 | 0.2622 | [ *CH2* ] * [ CL, BR, F, OR I ] | 0.0000 | 0.0000 |
| EG0924 | -6.4643 | [ *CH(*)* ] * [ *N(*)* ] | 0.0000 | 0.0000 |
| EG0953 | -2.2968 | [ *CH(*)* ] * [ ALIPHATIC S ] | 3.2400 | 3.2400 |
| EG1324 | 12.2709 | [ *C(=^)* ] * [ *N(*)* ] | 0.0000 | 0.0000 |
| EG1751 | 0.9605 | [ :CH: ] * [ O ] | 0.0000 | 0.0000 |
| EG2020 | 1.0668 | E ALIPHATIC N ] * ALIPHATIC N ] | 0.0000 | 0.0000 |
| EG2024 | -1.6693 | [ -OH] | 0.0000 | 0.0000 |
| EG2046 | 0.6689 | [ ALIPHATIC N ] * [ ALIPHATIC S ] | 0.0000 | 0.0000 |
| EG47 | 0.2902 | [ =CH- ] = [ =C< ] | 0.0000 | 0.0000 |
| ENOB12D | 7.9585 | [ -CH3 ] - * >C(@)@ ] | 0.0000 | 0.0000 |
| ES040F | 3.7095 | [ -CH3 ] - * >C(@)@ ] | 0.0000 | 0.0000 |
| PG05 | -1.4107 | [ ALIPHATIC C ] | 3.5530 | 4.7510 |
| PG0506 | 1.3334 | [ ALIPHATIC C ] * [ -CH3 ] | 3.6430 | 3.8560 |
| PG0555 | -4.7697 | [ ALIPHATIC C ] * [ *S* ] | -0.3655 | 0.2132 |
| PG1618 | 1.1346 | [ AROMATIC C ] : [ :C(*): ] | 0.0000 | 0.0000 |
| PG1818 | -1.3676 | [ :C(*): ] : [ :C( *): ] | 0.0000 | 0.0000 |
| PR19 | -3.6506 | [ :C(-): ] | 0.0000 | 0.0000 |
| QF19LB | -14.2451 | [ :C(-): ] : [ :C(:): ] | 0.0000 | 0.0000 |
| QG0609 | -2.2222 | [ -CH3 ] * [ *CH(*)* ] | 0.0000 | 0.0000 |
| QG2253 | 7.7357 | [ *NH* ] * [ ALIPHATIC S ] | 0.0000 | 0.0000 |
| QR0613 | 5.8447 | [ @CH2@ ] @ [ =C(@)@ ] | 0.0000 | 0.0000 |
| QS1219 | -7.9462 | [ =C< ] - T :C(-): ] | 0.0000 | 0.0000 |
| VF19LB | 10.1462 | [ :C(-): ] : [ :C(:): ] | 0.0000 | 0.0000 |
| VG0509 | 4.5512 | [ ALIPHATIC C ] * [ *CH(*)* ] | -2.1745 | -2.1745 |
| VG0546 | -0.8782 | [ ALIPHATIC C ] * [ ALIPHATIC O ] | 6.1738 | 6.1738 |
| VG0576 | 1.4096 | [ ALIPHATIC C ] * [ BR ] | 0.0000 | 0.0000 |
| VG06 | 1.6397 | [ -CH3 ] | 1.3040 | 1.3040 |
| VG0622 | 4.1566 | [ -CH3 ] * [ *NH* L | 0.0000 | 0.0000 |
| VG0646 | 2.0424 | [ -CH3 ] * [ ALIPHATIC O ] | 5.3800 | 5.3800 |
| VG0748 | 2.2212 | [ *CH2* ] * [ *O* ] | 4.7800 | 4.7800 |
| VG1273 | -1.7306 | [ *C(* [ CL, BR, F, OR I * | 0.0000 | 0.0000 |
| VG1320 | 3.7616 | [ *C(=-)* ] * [ ALIPHATIC N ] | 0.0000 | 0.0000 |
| VG1347 | 2.0400 | [ *C(=*)* ] * [ -OH I | 0.0000 | 0.0000 |
| VG1375 | 2.4176 | [ *C(=-)* ] * [ CL ] | 0.0000 | 0.0000 |
| VG1622 | -5.1913 | [ AROMATIC C * * [ *NH- ] | 0.0000 | 0.0000 |
| VG1647 | -1.2380 | [ AROMATIC C ] * [ -OH ] | 0.0000 | 0.0000 |
| VG1673 | -0.5780 | [ AROMATIC C ] * [ Cl, BR, F, OR I 1 | 0.0000 | 0.0000 |

FIGURE 11-A

| | | | | |
|---|---|---|---|---|
| VG27 | 14.8891 | [ *N[=* ] | 0.0000 | 0.0000 |
| VG4653 | 0.4670 | [ALIPHATIC O ] * [ALIPHATIC S ] | 0.0000 | 0.0000 |
| VG5365 | -2.7052 | [ ALIPHATIC S ] * [ ALIPHATIC P ] | 2.7190 | 6.1600 |
| VG56 | 0.845C | [=S ] | 0.0000 | 11.6100 |
| VN0508 | - 6.9851 | [ -CH2- ] - * >CH- | -1.9740 | -1.9740 |
| *N0512 | 5.6668 | [ -CH2- ] - [ =C | -1.1930 | -1.1930 |
| VN0841 | -3.1713 | [ >CH- ] - [ -OH ] | 0.0000 | 0.0000 |
| VS1344D | -0.9986 | [ =C(* ] = [ =O ] | 0.0000 | 0.0000 |
| CONSTANT | -4.4040 | LDA CONSTANT | 1.0 | 1.0 |

---

BOND CODES:
    NON-CYCLIC SINGLE BOND
    NON-CYCLIC DOUBLE BOND
    CYCLIC SINGLE BOND
    CYCLIC DOUBLE BOND
    ANY SINGLE BOND
    ANY DOUBLE BOND
    TRIPLE BOND
    AROMATIC BOND
    ANY BOND

A: THE FIRST LETTERS E, P, Q, AND V IN THE CODE REFER, RESPECTIVELY, TO PLAIN E-VALUE3, QUANTUM NUMBER ADJUSTED E-VALUES3, THE COUNT, AND THE RATIO OF PLAIN E-VALUE TO THE COUNT OF THE CORRESPONDING FRAGMENT DESCRIBED IN THE COLUMN •NAME*.

FIGURE 11-B

FORTRAN CODE FOR GENERATION OF OPS OF A MODEL.

```
C=============================================
C PRO # VG1191

C A PROGRAM FOR COMPUTING BOUNDARIES OF OPTIMUM PREDICTION SPACE.

C AUTHOR:  DR. VIJAY K. GOMBAR
C          HEALTH DESIGNS, INC.
C          183 EAST MAIN STREET
C          ROCHESTER, NY 14604.

C    PROGRAM LIMITS:   30 OBSERVATIONS, 11 DESCRIPTORS (INCLUDING
C                      INTERCEPT)
C
C_ _ _ _ _ _ _ _ _ _ _ _ _ _ _ _ _ _ _ _ _ _
C    TITLE .........   MAXIMUM 40-CHARACTER LONG PROJECT/PROGRAM
C                      TITLE
C    CHOICE ........   CHOICE OF TRANSFORMATION.
C    VARNAM ........   MAXIMUM 12-CHARACTER LONG DESCRIPTOR
C                      IDENTIFIERS
C    NOBS ..........   NUMBER OF OBSERVATIONS, I
C    NVAR ..........   NUMBER OF VARIABLES, J (INCLUDING INTERCEPT)
C    P (I,J) .......   J VALUES OF VARIABLES FOR I OBSERVATIONS (I
C                      LINES, EACH WITH J VALUES. VALUE FOR INTERCEPT
C                      IS 1.0)

IMPLICIT REAL*8 (A-H, O-Z~
      CHARACTER*30 INPFIL,OUTFIL,INTFIL
      PARAMETER nv = 11
      PARAMETER nc = 30
      DIMENSION TITLE(10~, VARNAM(nv,3), P(nc, nv), DOPS(NC)
      DIMENSION S(nc, nc), SBAR(nc, nc), OPS(nc, nv)
      DIMENSION A(nc, nv), VEC(nc, nc), SUMX(nv), D(nc)
      COMMON COPS(nv), ROPS(nv)
      COMMON /PARAM/ NOBS, NVAR

C_ _ _ _ _ _ _ _ _ _ _ _ _ _ _ _ _ _ _ _ _ _
C FILE ASSIGNMENT.THREE FILES ARE ASSIGNED; INPFIL, OUTFIL, AND INTFIL.
C INPFIL IS THE INPUT FILE, OUTFIL IS THE OUTPUT OF DETAILED RESULTS,
C AND INTFIL IS THE INTERMEDIATE FILE TO BE USED SUBSEQUENTLY IN THE
C VG1291 PROGRAM.
C_ _ _ _ _ _ _ _ _ _ _ _ _ _ _ _ _ _ _ _ _ _
 5010 TYPE 5011
 5011 FORMAT(' ENTER THE NAME OF THE INPUT FILE: ',$)
      READ(*,FMT='(A)') INPFIL
      I = INDEX(INPFIL,'.')
      J = INDEX(INPFIL,' ')
      IF ( J .LE. 1 ) GO TO 5020
      OUTFIL(L:J-1) = INPFIL(L:J-1)
```

FIGURE 12-A

```
        IF ( I .EQ. 0 ) THEN
                    OUTFIL(J:J) =
                    I = J
        ENDIF
        INTFIL(L:I) = OUTFIL(L:I)
        OUTFIL(I+L:I+3) = 'OPS'
        INTFIL(I+L:I+3) = 'INT'
        GO TO 5050
5020 WRITE(*,5021) INPFIL
5021 FORMAT(' OPS-I-INVFIL ?? INVALID FILE NAME: ',A)
        GO TO 5010
5030 WRITE(*,5021) OUTFIL
        GO TO 5010
5040 WRITE(*,5021) INTFIL
        GO TO 5010
5050 CONTINUE
        OPEN(UNIT=3, FILE=INPFIL, STATUS = 'OLD', ERR=5020)
        OPEN(UNIT=4, FILE=INTFIL, STATUS = 'UNKNOWN', ERR=5040)
        OPEN(UNIT=8, FILE=OUTFIL, STATUS = 'UNKNOWN', ERR=5030)
        WRITE(*,5060) INTFIL(L:I+3)
5060 FORMAT(/' OUTPUT OF VGLL91 REQUIRED FOR INPUT TO VG1291 WRITTEN'
1     ' IN: ', A)
        WRITE(*,5070) OUTFIL(1: I+3 )
5070 FORMAT(/~ DETAILED OUTPUT OF VGLL91 WRITTEN IN: ~ A)

C_ _ _ _ _ _ _ _ _ _ _ _ _ _ _ _ _ _ _ _
C INPUT SECTION.
C READ CONTROL PARAMETERS, VALUES AND NAMES OF VARIABLES
C AND PRINT FOR
C CHECKLNG AND VERIFICATION. A BLANK RECORD WILL TERMLNATE
C THE RUN.
C_ _ _ _ _ _ _ _ _ _ _ _ _ _ _ _ _ _ _ _
999 READ(3,500) NVAR, NOBS, CHOICE, (TITLE(I),I=1,10)
500 FORMAT(I3,I3,A4,1X,10A4)
        WRITE(4,*) NVAR
        IF(NOBS.EQ.0) GO TO 998
        WRITE(8,501) (TITLE(I),I=1,10)
501 FORMAT(/' OPS ANALYSIS FOR ~,10A4/)
        WRITE(8,522)
522 FORMAT(LX,'VARIABLES AVAILABLE FOR THIS ANALYSIS'/)
        J = 1
        VARNAM(L,L) = 'INTE'
        VARNAM(1,2) = ~RCEP~
        VARNAM(1,3) = 'T
        WRITE(8,530) J,(VARNAM(J,L), L=1,3)
        DO 10 I=2,NVAR
        READ(3,525) J,(VARNAM(J,L),L=1,3)
525     FORMAT(I2,LX,3A4)
        WRITE(8,530) J,(VARNAM(J,L), L=1,3)
530     FORMAT(I2,LX,3A4)
10      CONTINUE
        WRITE(8,532)
```

FIGURE 12-B

```
532     FORMAT(/LX,~INPUT DATA'//)
        DO 35 I=L,NOBS
        P(I,L) = L.D0
        WRITE(8,540) P(I,L)
        IN = 2
        IT = 12
535     IF ( IT .GT. NVAR ) IT = NVAR
        READ~3,*) (P(I,J)~J=IN~IT~
        WRITE(8,540) (P(I,JJ,J=IN,IT)
        IF ( IT .NE. NVAR ) THEN
        IN = IN + 11
        IT = IT + 11
        GO TO 535
        ENDIF
35      CONTINUE
540     FORMAT(2X,LLF10.4)
546     FORMAT(LH1)
        WRITE(8,581) NOBS, NVAR
581     FORMAT~/LX,'NO. OF DATA POINTS =',I4/
    +   LX,°NO. OF VARIABLES  =I,I4/~

C_____._____
C INITIALIZATION ZONE.
C_____

NVAR1 = NVAR-1
        FNOBS = FLOAT(NOBS)

~_____
C CHOOSE TRANSFORMATION ALGORITHM FOR TRANSLATING P MATRIX INTO
C S MATRIX THE TRANSFORMATION FROM P TO S MARIX IS LINEAR.
C THE DIMENSIONS OF P AND S MATRICES ARE SAME; NOBSXNVAR.
        IF ( CHOICE .EQ. 'CSTR' ) CALL CSTR(P,NOBS,NVAR,S)
        IF ( CHOICE .EQ. 'RMTR' ) CALL RMTR(P,NOBS,NVAR,S)
        WRITE(4,*) S(1,1)
        DO 23 J = 2,NVAR
    23  WRITE(4,*) COPS(J),ROPS(J)
C TRANSPOSE MATRIX S INTO MATRIX S'

CALL TRANS(S,NOBS,NVAR,SBAR)
        WRITE(8,1520)
1520    FORMAT(/4X,' TRANSPOSED S MATRIX: '//)
        DO 1519 I=L,NVAR
1519    WRITE(8,540)  (SBAR(I,J),J=L,NOBS)

C FIND THE MATRIX PRODUCT S'S IN MATRIX A. ORDERS OF MATRICES S' AND
C S ARE (NVARXNOBS) AND (NOBSXNVAR), RESPECT.

CALL MATMUL(SBAR,NVAR,NOBS,S,NVAR,A)
        WRITE(8,2520)
2520    FORMAT(/4X,' PRODUCT OF (TRANSPOSED S) AND (S) MATRICES: ')
```

FIGURE 12-C

```
            DO 2519 I=L,NVAR
 2519   WRITE(8,540) (A(I,J),J=L,NVAR)
C_ _ _ _ _ _ _ _ _ _ _ _ _ _ _ _ _ _ _ _ _ _ _ _ _ _ _
C FIND EIGENVECTORS AND EIGENVALUES OF MATRIX A
C_ _ _ _ _ _ _ _ _ _ _ _ _ _ _
        CALL DIAG(A,NVAR,VEC)
        WRITE(8,3520)
 3520   FORMAT(/4X,' EIGENVALUES AFTER DIAGONALIZATION: ')
        WRITE(8,540) (A(I,I),I=L,NVAR)
        WRITE(8,4520)
  4520   FORMAT(/4X,' EIGENVECTORS AFTER DIAGONALIZATION: ')
        DO 4519 I=L,NVAR
          WRITE(4,*) A(I,I)
          WRITE(4,*) (VEC(I,J),J=L,NVAR)
          WRITE(8,540) (VEC(I,J),J=L,NVAR)
 4519 CONTINUE

C_ _ _ _ _ _ _ _ _
C COMPUTE OPS AS MULTIPLE OF S AND VEC MATRICES
C_ _ _ _ _ _ _ _ _ _ _ _ _ _ _ _ _
      CALL MATMUL(S,NOBS,NVAR,VEC,NVAR,OPS)
      WRITE(8,5520)
 5520   FORMAT(~4X,~ THE OPS-MATRIX DEFINES THE OPS '/)
        DO 5519 I=L,NOBS
 5519   WRITE~8~540) (OPS(I,J),J=L~NVAR)

C_ _ _ _ _ _ _ _ _ _ _ _ _ _ _ _ _ _ _ _ _ _ _ _ _ _
C CHECK THAT SUM OF SQUARES OF EACH COLUMN IN OPS MATRIX
C IS EQUAL TO THE CORRESPONDING EIGENVALUE.
C_ _ _ _ _ _ _ _ _ _ _ _
      DO 192 L = 1,NVAR
        SUMX(L) = 0.D0
        DO 192 I = 1,NOBS
          SUMX(L) = SUMX(L) + OPS(I,L)*OPS(I,L)
  192 CONTINUE
      WRITE(8,540) (SUMX(L), L = 1,NVAR)

C_ _ _ _ _ _ _ _ _
C FIND THE BOUNDARIES OF THE OPS.
C_ _ _ _ _ _ _ _
      WRITE(8,196) (TITLE(I),I=1,10)
  196 FORMAT(/4X,' BOUNDARIES OF THE OPS FOR ',10A4//)
      DO 193 J = 1,NVAR
        DO 194 I = 1,NOBS
          D(I) = OPS(I,J)
  194   CONTINUE
      CALL ORDER (D,NOBS,SMALL,BIG)
      WRITE(4,*) SMALL,BIG
      WRITE(8,195) J, SMALL, BIG
  195 FORMAT(/4X,'VARIABLE # ',I3,' LOWEST LIMIT = ',F10.5,
     +        ' HIGHEST LIMIT = ',F10.5)
```

FIGURE 12-D

```
C_____
C CHECK IF EVERY OBSERVATION IN THE TRAINING SET IS WITHIN
C THE BOUNDS OF THE OPS.
C_____
          DO 731 I = 1,NOBS
     IF ( OPS(I,J) .LT. SMALL .OR. OPS(I,J) .GT. BIG )
     +         THEN
       SDEV = SMALL - OPS(I,J)
       BDEV = OPS(I,J) - BIG
        WRITE(8,732) J,I,OPS(I,J),SMALL,BIG,SDEV,BDEV
     ENDIF
  73-2 FORMAT(/4X,'IN DIMENSION',I4,' OBSERVATION',I4,' OUTSIDE OF'
     +       ' THE OPS'/5E14.8)
  731 CONTINUE
  193 CONTINUE

C_____
C COMPUTE DISTANCE FROM OPS.
C_____
      WRITE(8,674)
  674 FORMAT(/4X,' D-OPS FOR EACH OBSERVATION: '//)
      DO 671 I = 1,NOBS
        DOPS(I) = 0.D0
        DO 672 J = 1,NVAR
  672     DOPS(I) = DOPS(I) + OPS(I,J)*OPS(I,J)/A(J,J)
  671 WRITE(8,673) I,DOPS(I)
  673 FORMAT(I4,2F10.4)
      CALL ORDER(DOPS,NOBS,S~LL,BIG)
      WRITE(4,*) SMALL,BIG

C_
      GO TO ~99
  998 STOP
      END
C================================
C SORT A VECTOR X OF N ELEMENTS TO PICK THE SMALLEST
C AND THE LARGEST ELEMENTS.
C_____
      SUBROUTINE ORDER(X,N,SMALL,BIG)
      IMPLICIT REAL*8 (A-H, O-Z)
      PARAMETER nc = 30
      DIMENSION X(nc)

SMALL = X(1)
      BIG = SMALL
      DO 1 I = 2,N
        IF ( X(I) .LT. SMALL ) SMALL = X(I)
        IF ~ X~I~ .GT. BIG  ~ BIG  = X(I)
    1 CONTINUE
      RETURN
      END
```

FIGURE 12-E

```
C_____
C TRANSPOSE AN NXM MATRIX A INTO AN MXN MATRIX AT.
C_____
      SUBROUTINE TRANS(A,N,M,AT)
      IMPLICIT REAL*8 (A-H, O-Z)
      PARAMETER nc = 30
      DIMENSION A(nc, nc), AT(nc, nc)
C
         DO 1 J = 1,M
           DO 1 I = 1,N
      AT(J,I) = A(I,J)
    1 CONTINUE
      RETURN
      END
C_____
C SUBROUTINE TO FIND THE PRODUCT OF MATRICES A(NXM) AND B(MXL). THE
C RESULT IS A MATRIX C(NXL).
C N: ROWS OF MATRIX A. WILL BE THE ROWS OF MATRIX C ALSO.
C M: COLUMNS OF MATRIX A AND ROWS OF MATRIX B.
C L: COLUMNS OF MATRIX B. WILL BE COLUMNS OF MATRIX C ALSO.

C_____
      SUBROUTINE MATMUL(A,N,M,B,L,C)
      IMPLICIT REAL*8 (A-H,O-Z)
      PARAMETER nc = 30
      PARAMETER nv = 11
      DIMENSION A(nc, nc), B(nc, nc), C(nc, nc)

DO 181 I = 1,N
         DO 181 J = 1,L
            C(I,J) = 0.D0
            DO 181 K = 1,M
  181    C(I,J) = C(I,J) + A(I,K)*B(K,J)
         RETURN
         END

C_____
C A SUBROUTINE FOR DIAGONALIZATION OF A REAL SYMMETRIC MATRIX OF
C ORDER N USING JACOBI'S METHOD.
C_____
      SUBROUTINE DIAG( A,N,S)
      IMPLICIT REAL*8 ~A-H, O-Z)
      REAL*8 NU~ NUFINAL
      PARAMETER NC = 30
      PARAMETER NV = 11
      DIMENSION A(NC,NV), VEC(NC,NC)
C
      AN = DFLOAT(N)
      RHO = LD-15
      DO 1 I = 1,N
        DO 2 J = 1,N
```

FIGURE 12-F

```
          IF (I .NE. J)
    -&      THEN
        VEC(I,J) = 0.D0

VEC(I,J) = L.D0

ELSE

ENDIF
    2   CONTINUE
    1 CONTINUE

C
    C COMPUTE INITIAL MATRIX NORM

NU = 0.D0
        DO 3 I = 1,N
          DO 4 J = 1,N
            IF ( I .NE. J )
    1          THEN
                NU = NU + A(I,J)*A(I,J)
            ENDIF
     4 CONTINUE
     3 CONTINUE

NU = DSQRT(NU)
        NUFINAL = NU*RHO/AN
    801        NU = NU/AN
            DO 5 IQ = 2,N
              IP = 1
    802           IFOUND = 0
          IF ( DABS(A(IP,IQ)) .GT. NU )
    1          THEN
                IFOUND = 1
                APP = A(IP,IP)
                AQQ = A(IQ,IQ)
                APQ = A(IP,IQ)
                ALM = - APQ
                AMU = (APP - AQQ)/2.D0
                IF ( AMU .EQ. 0.D0 .OR. AMU .LT. RHO )
    1              THEN
                    OMEGA = L.D0
    ELSE
      OMEGA = ALM/DSQRT(ALM*ALM + AMU*AMU)
      OMEGA = OMEGA~DSIGN(L.D0 ,AMU)

ENDIF
              SINE = OMEGA~DSQRT(2.D0 *(L.D0 +
    1                  DSQRT(L.D0 - OMEGA*OMEGA)))
                    SINE=-1.0*SINE
                    COSINE = DSQRT(L.D0 - SINE*SINE)
                    DO 6 I = 1,N
```

FIGURE 12-G

```
            TEMP = A(I,IP)*COSINE - A(I,IQ)*SINE
            A(I,IQ) = A(I,IP)*SINE + A(I,IQ)*COSINE
            A(I,IP) = TEMP
            TEMP = VEC(I,IP)*COSINE - VEC(I,IQ)*SINE
            VEC(I,IQ) = VEC(I,IP)*SINE + VEC(I,IQ)*COSINE
            VEC(I,IP) = TEMP
          CONTINUE
          C02 = COSINE*COSINE
          SI2 = SINE*SINE
          SICO = SINE*COSINE
          SICO2 = 2.D0 *SICO*APQ
          A(IP,IP) = APP*C02 + AQQ*SI2 - SICO2
          A(IQ,IQ) = APP*SI2 + AQQ*C02 + SICO2
          A(IP,IQ) = (APP - AQQ)*SICO + (C02 - SI2)*APQ
          A(IQ,IP) = A(IP,IQ)
          DO 7 I = L,N
            A(IP,I) = A(I,IP)
            A(IQ,I) = A(I,IQ)
7         CONTINUE
        END IF
        IP = IP + 1
        WRITE(8,*) NUFINAL, NU, IQ,
        IF ( IP .LE. (IQ-1) ) GO TO
5     CONTINUE
      IF ( NU .GT. NUFINAL .OR. IFOUND
      RETURN
      END

C_____
C COMPUTE S MATRIX FROM THE GIVEN X MATRIX. S IS A TRANSLATION
C OF X IN TERMS OF FACTORS COPS (C) AND ROPS (R) WHERE COPS IS THE
C MEAN AND ROPS IS THE SQUARE ROOT OF SUM OF DEVIATIONS FROM
C THE MEAN.
C_____
      SUBROUTINE CSTR(P,NR,NC,S)
      IMPLICIT REAL*8 (A-H,O-Z)
      parameter n= 30
      parameter nv = 11
      DIMENSION P(ncm, nv), S(ncm, ncm)
      COMMON COPS(nv), ROPS(nv)

C
C COMPUTE C AND R
C
      FNR = DFLOAT(NR)
      DO 64 J = 1,NC
      SUM = 0.D0
      DO 65 I=L,NR
          SUM = SUM + P(I,J)

IP, IFOUND
      802
```

FIGURE 12-H

```
      .EQ. 1 ) GO TO 801
   65  CONTINUE
     COPS~J) = SUM/NR
  64 CONTINUE
     DO 67 J = 1,NC
         SUM = O.D0
         DO 68 I=L~NR
           SUM = SUM + ( P(I,J) - COPS(J) )*~2
   68    CONTINUE
     ROPS(J) = DSQRT(SUM)
     WRITE(8,66) J, COPS(J), ROPS(J)
  66 FORMAT(//4X, 'VARIABLE # ',I4,4X, 'C = ',F14.6,4X,'R =
  67 CONTINUE

C COMPUTE S MATRIX. S(I,L)S CORRESPOND TO THE INTERCEPT AND ARE ALL
C CONSTANT EQUAL TO THE INVERSE OF THE SQRT OF NOBS. THE REMALNING
C S(I,J)S ARE: ( P(I,J) - COPS(J) )/ROPS(J). THE MEAN OF S(J)S IS
C ZERO AND SUM OF S(J)S SQUARES IS ONE.

WRITE~8,666~
 666 FORMAT(4X,' S MATRIX (TRANSLATED FROM MATRIX P):'/
    1 4X,  //)
         DO 69 I = 1,NR
           DO 72 J = 1,NC
             IF ( J .EQ. 1 )
    &         THEN
                 S(I,J) = L.D0 / DSQRT(FNR)

S(I,J) = ( P(I,J) - COPS(J) ) / ROPS(J)

1            ' SQUARED SUM = ~,F10.4)
    70 CONTINUE
     RETURN

,F14.6/)

ELSE
     S(I,J) = ( P(I,J) - COPS(J) ) / ROPS(J)
     ENDIF
  72 CONTINUE
     WRITE(8,73) I, ( S(I,J) , J = 1,NC)
  73 FORMAT( I4, 8F9.4)
  69 CONTINUE
C
C CHECK IF THE CONSTRUCTED S MATRIX IS OK.
C THE MEAN OF S(J)S IS ZERO AND SUM OF S(J)S SQUARES IS ONE.
C
        DO 70 J = 1,NVAR
          SUMJSQ = O.D0
          SUMJ = 0.D0
```

FIGURE 12-I

```
      DO 71 I = 1,NOBS
        SUMJSQ = SUMJSQ + S(I,J)*S(I,J)
        SUMJ = SUMJ + S(I,J)
   71 CONTINUE
      SUMJ = SUMJ / FNOBS
      WRITE(8,166) J, SUMJ, SUMJSQ
  166 FORMAT(/4X,' VARIABLE # ', I4, ' MEAN = ',F10.4,
      END
C_ _ _ _ _ _ _ _ _ _ _ _ _ _ _ _ _ _ _ _ _ _ _ _ _ _ _ _
C COMPUTE S MATRIX FROM THE GIVEN P MATRIX. S IS A TRANSLATION
C OF P IN TERMS OF FACTORS COPS (C) AND ROPS (R) WHERE COPS IS THE
C MIDRANGE AND ROPS IS THE HALF OF THE RANGE.
      SUBROUTINE RMTR(P,NR,NC,S)
      IMPLICIT REAL*8 (A-H,O-Z)
      PARAMETER ncm = 30
      PARAMETER ncv= 11
      DIMENSION P(ncm, nv), S(ncm, ncm),D(ncm)
      COMMON COPS(nv),ROPS(nv)
C COMPUTE C AND R
      DO 64 J = 1,NC
        DO 65 I = 1,NR
          D(I) = P(I,J~
   65   CONTINUE
        CALL ORDER(D,NR,SMALL,BIG)
        COPS(J) = ( BIG + SMALL )/2.D0
        ROPS(J) = ( BIG - SMALL )/2.D0
        WRITE(8,66) J, COPS(J), ROPS(J)
   66   FORMAT(//4X, 'VARIABLE # ',I4,4X, 'C = ~,F14.6,4X,'R = ',F14.6/)
   64 CONTINUE
C COMPUTE S MATRIX. S(I,L)S CORRESPOND TO THE INTERCEPT AND ARE ALL
C CONSTANT EQUAL TO 1.0. THE REMAINING S(I,J)S ARE:
C ( P(I,J) - COPS(J) )/ROPS(J).
      WRITE(8,666)
  666 FORMAT(4X,' S MATRIX (TRANSLATED FROM MATRIX P):'/
     1 4X,      //)
      DO 69 I = 1,NR
        DO 72 J = 1,NC
          IF ( J .EQ. 1 )
          THEN
            S(I,J) = 1.DG
          ELSE
            S(I,J) = ( P(I,J) - COPS(J) ) / ROPS(J)
          ENDIF
   72   CONTINUE
        WRITE(8,73) ( S(I,J) , J = 1,NC)
   73   FORMAT( 8F9.4)
   69 CONTINUE
      RETURN
      END
C_ _ _ _ _ _ _ _ _ _ _ _ _ _ _ _ _ _
```

FIGURE 12-J

FORTRAN CODE FOR (1) CHECKING IF QUERY WITHIN OPS, AND
(2) COMPUTING D-OPS

```
C=================================================
C PROGRAM # VG1291
C
C A PROGRAM FOR CALCULATING THE DISTANCE FROM OPTIMUM
C PREDICTION SPACE (OPS), D-OPS.
C D-OPS ALWAYS REFERS TO A MODEL FOR WHICH THE OPS HAS
C BEEN ESTABLISHED BY USING THE VG1191 PROGRAM (SEE FIGURE 12).
C
C THE PROGRAM VG1191 WRITES OUT THE FILE MODELOPS.DAT WHICH
C CONTAINS INPUT NECESSARY TO EXECUTE VG1291. THE ONLY
C ADDITIONAL INPUT NEEDED IS THE VALUES OF DESCRIPTOR VARIABLES
C FOR THE POINT(S) FOR WHICH THE D-OPS IS TO BE COMPUTED.
C_ _ _ _ _ _ _ _ _ _ _ _
      IMPLICIT REAL*8 (A-H,O-Z)
      DIMENSION C(235), R(235), P(235), S(235)
      DIMENSION A(235), VEC(235,235), OPS(235)
      DIMENSION SMALL(235), BIG(235)
      CHARACTER*L OPT,IOPT,STAR

C_ _ _ _ _ _ _ _ _
C FILE ASSIGNMENT.THREE FILES ARE ASSIGNED; INPFIL, OUTFIL, AND INTFIL.
C INPFIL IS THE INPUT FILE PRODUCED FROM VG1191, OUTFIL IS THE OUTPUT
C OF DETAILED RESULTS, AND INTFIL IS THE FILE OF P-VALUES FOR WHICH
C THE D-OPS IS TO BE COMPUTED.
C_ _ _ _ _ _ _ _ _ _ _ _
      CHARACTER*30 INPFIL,OUTFIL,INTFIL
5010 TYPE 5011
5011 FORMAT(' ENTER THE NAME OF THE INPUT FILE FROM VG1191: ',$)
      READ(*,FMT='(A)') INPFIL
      I = INDEX(INPFIL,'.')
      J = INDEX(INPFIL,' ')
      IF ( J .LE. 1 ) GO TO 5020
      OUTFIL(L:J-1) = INPFIL(L:J-1)
      IF ( I .EQ. 0 ) THEN
            OUTFIL(J:J)
            I = J
      ENDIF
      OUTFIL(I+L:I+3) = 'OUT'
      IND = I
      GO TO 5050

5020 WRITE(*,5021) INPFIL
5021 FORMAT(' EPD-I-INVFIL ?? INVALID FILE NAME: ',A)
      GO TO 5010
5030 WRITE~*,5021) OUTFIL
      GO TO 5010
5050 CONTINUE
      OPEN(UNIT=3, FILE=INPFIL, STATUS = 'OLD', ERR=5020)
```

FIGURE 13-A

```
      OPEN(UNIT=8, FILE=OUTFIL, STATUS _ 'UNKNOWN', ERR=5030)
      WRITE(*,5070) OUTFIL(L:I+3)
5070 FORMAT(/' DETAILED OUTPUT OF VG1291 WRITTEN IN: ' A)
C READ THE INTERMEDIATE FILE OUTPUT BY THE PROGRAM VG1191
C
C_ _ _ _ _ _ _ _ _ _ _ _ _ _ _ _ _ _ _
C NVAR .........     NUMBER OF DESCRIPTOR VARIABLES
C S(1) .........INTERCEPT FROM S MATRIX
C C(I) .........FACTOR C FOR TRANSLATING INPUT DESCRIPTOR X TO Z-SCALE
C R(I)- ........FACTOR R FOR TRANSLATING INPUT DESCRIPTOR X TO Z-SCALE
C A(I) .........EIGENVALUE FOR COMPUTING OPS
C VEC(I,J) .....    EIGENVECTORS FOR COMPUTING OPS
C SMALL ........    LOWER BOUND OF A VARIABLE IN THE OPS
C BIG ..........    UPPER BOUND OF A VARIABLE IN THE OPS
C_ _ _ _ _ _ _ _ _ _ _ _ _ _ _ _ _
      READ(3,*) NVAR
      READ(3,~) S(1)
      DO 3 I = 2,NVAR
READ(3,*) C(I),R(I)
3 CONTINUE
      DO 4 I = 1,NVAR
READ(3,*) (A(I))
READ(3,*) (VEC(I,J),J=L,NVAR)
4 CONTINUE
      DO 20 I = 1,NVAR
  20  READ(3,*) SMALL(I),BIG(I)
      READ(3,*) SMALVF, BIGVF

C _ _ _ _ _ _ _ _ _ _ _ _ _ _ _ _ _ _ _ _
C ACCEPT DESCRIPTOR VALUES OF THE GIVEN POINT(S). EITHER
C THROUGH FILE OR INTERACTIVELY.
C _ _ _ _ _ _ _ _ _ _ _ _ _ _ _
      ICNT = 1
      TYPE 25
 25 FORMAT(' WISH TO ENTER P-DATA INTERACTIVELY/'
   +        ~THRU FILE ?: (I/F)[F]  ~,$)
      ACCEPT 16, IOPT
      IF ( IOPT .EQ. 'I' ) GO TO 30

5012 TYPE 5013
5013 FORMAT(' ENTER THE NAME OF THE INPUT FILE WITH X-VALUES: ',$)
     READ(*,FMT='(A)') INTFIL
     I = INDEX(INTFIL,':')
     J = INDEX(INTFIL,'~)
     IF ( J .GT. 1 ) GO TO 5014
5015 WRITE(*,5021) INTFIL
     GO TO 5012
5014 OPEN(UNIT=7, FILE=INTFIL, STATUS = 'OLD', ERR=5015)
 997 READ(7,*,END=999) (X(I),I=2,NVAR)
     GO TO 99

30 OPT = ~Y~
```

FIGURE 13-B

```
998 IF ( OPT .NE. 'Y' ) GO TO 999
   DO 33 I = 2,NVAR
      TYPE 34, I
34 FORMAT(2X,'VALUE FOR VARIABLE ',I3,
33 ACCEPT *, P(I)

99 WRITE(8,18) ICNT

,$ )
  18 FORMAT(///2X,~POINT',I4,' .**************~**'/)
     WRITE(8,17) (P(I),I=2,NVAR)
  17 FORMAT(LOF8.3)

C_____
C TRANSLATE P TO S.
C_____
      DO 5 I = 2,NVAR
         S(I) = ( P(I) - C(I) ) / R(I)
   5  CONTINUE
C_____
C TRANSFORM S TO OPS AND CHECK IF QUERY LIES WITHIN THE
C BOUNDS DEFINED BY THE OPS. IF NOT, INFORM SO.
C_____
      IFLAG = 0
      DO 7 I = 1,NVAR
         STAR = ~ ~
         OPSTI) = OD0
         DO 6 J = 1,NVAR
            OPS(I) = OPS(I) + S(J)*VEC(J,I)
    6    CONTINUE
         SDEV = SMALL(I) - OPS(I)
         BDEV = OPS(I) - BIG(I)
         DEV = BDEV
         IF (SDEV .GT. 0.0) DEV = SDEV
         IF ( OPS(I) .GT. BIG(I) .OR. OPS(I) .LT. SMALL(I) )
  1      THEN
            IF ( IFLAG .EQ. 0 ) WRITE(8,19)
            IFLAG = 1
            STAR = '*'
            WRITE(8,31) I,STAR,SMALL(I),OPS(I),BIG(I),DEV
         ENDIF
31 FORMAT(I6,A1,4F14.6)
19 FORMAT(/2X'DIMENSION LOWER BOUND VALUE(W-SCALE)',
  &' UPPER BOUND DIST FROM OPS'/)
7 CONTINUE
      WRITE(8,71)
71 FORMAT(///5X,' D-OPS   CONTRIBUTIONS: '/)
C_____
C COMPUTE D-OPS.
C_____
      SUM = OD0
      DO G J = L~NVAR
```

FIGURE 13-C

```
      TERM = OPS(J)*OPS(J)/A(J)
      SUM = SUM + TERM
      WRITE(8,32) J,TERM
    9 CONTINUE
   32 FORMAT(5X,I6,2X,F14.6)
      WRITE(8,2) SUM, SMALVF, BIGVF
    2 FORMAT(/2X,'D-OPS
     &' -',F9.5)
C     WRITE(8,201)
C 201 FORMAT(LH1)
      ICNT = ICNT + 1
      IF (IOPT .NE. ~I~ ) GO TO 997
      PRINT 15

,F9.5,', MODEL RANGE =',F9.5,
   15 FORMAT(2X,~D-OPS TO BE COMPUTED FOR MORE POINTS (Y~/N): [N]
      READ (*,16) OPT
   16 FORMAT(A1)
      GO TO 998
  999 STOP
      END
```

FIGURE 13-D

FORTRAN CODE FOR CALCULATION OF PROPERTY-SENSITIVE SIMILARITY (PSS) DISTANCE BETWEEN TWO OBJECTS

R_____

PROGRAM ~ VG1391

```
C
C A PROGRAM FOR COMPUTATION OF PROPERTY SENSITIVE SIMILARITY
C DISTANCE, PSS, BETWEEN A QUERY POINT Q AND A TRAINING SET
C POINT T.
C AUTHOR:  DR. VIJAY K. GOMBAR
C      HEALTH DESIGNS, INC.
C      ROCHESTER, NY 14604
C_____
      IMPLICIT REAL*8 (A-H, O-Z)
      CHARACTER*30 INPFIL,OUTFIL
      PARAMETER NV = 11
      PARAMETER NC = 30
      DIMENSION PQ(LL), PT(LL), W(LL), XPRODQ(LL), XPRODT(LL)

5010 TYPE 5011
 5011 FORMAT(' ENTER THE NAME OF THE INPUT FILE: ',$)
      READ~*~FMT='(A~') INPFIL
      I = INDEX(INPFIL,'.')
      J = INDEX(INPFIL,' ')
      IF ( J .LE. 1 ) GO TO 5020
      OUTFIL(L:J-L) = INPFIL(L:J-L)
      IF ( I .EQ. 0 ) THEN
      OUTFIL~J:J)
      I = J
      ENDIF
      INTFIL(L:I) = OUTFIL(L:I)
      OUTFIL(I+L:I+3) = 'OUT'
      GO TO 5050
 5020 WRITE(*,5021) INPFIL
 5021 FORMAT(' PSS-I-INVFIL ?? INVALID FILE NAME: ',A)
      GO TO 5010
 5030 WRITE(*,5021) OUTFIL
      GO TO 5010
 5050 CONTINUE

OPEN(UNIT=3, FILE=INPFIL, STATUS = 'OLD', ERR=5020)
      OPEN(UNIT=8, FILE=OUTFIL, STATUS = 'UNKNOWN', ERR=5030)
      WRITE(*,5070) OUTFIL(L:I+3)
 5070 FORMAT(/~ DETAILED OUTPUT OF VG1391 WRITTEN IN: ' A)
C_____
C INPUT SECTION.
C READ CONTROL VARIABLES: # OF DESCRLPTOR VARIABLES IN
C MODEL, TITLE READ WEIGHTS OF DESCRIPTOR VARIABLES, NVAR,
C IN MODEL, AND VALUES OF DESCRIPTOR VARIABLES FOR OBJECTS T
```

FIGURE 14-A

```
C AND Q
C_ _ _ _ _ _ _ _ _ _ _ _ _
999 READ(3,500) NVAR, (TITLE(I),I=1,10)
500 FORMAT(I3,LX,10A4)
    IF(NOBS.EQ.0) GO TO 998
    WRITE(8,501) (TITLE(I) ,I=L,10)
501 FORMAT(/' PSS DISTANC~FOR ~,10A4/)
    WRITE(8,522)
522 FORMAT(LX,'VARIABLES AVAILABLE FOR THIS ANALYSIS'/)
    DO 10 I=L,~VAR
    READ(3,525) J,(VARNAM(J,L),L=1,3)
525 FORMAT~I2,LX~3A4)
    WRITE(8,530) J,(VARNAM(J,L), E=1,3)
530 FORMAT(I2,LX,3A4)
10  CONTINUE

C_ _ _ _ _ _ _ _ _ _ _ _ _ _ _ _ _ _ _ _ _ _ _ _
C READ WEIGHTS OF DESCRIPTOR VARIABLES, NVAR, IN MODEL, AND
C VALUES OF DESCRIPTOR VARIABLES FOR OBJECTS T AND Q
C_ _ _ _ _ _ _ _ _ _ _ _ _ _ _ _ _ _ _ _ _ _ _
    WRITE(8,532)
532 FORMAT~/LX~'DESCRIPTOR WEIGHTS,  Q-VALUE   T-VALUE'//)
    DO 35 I = L,NVAR
    READ(3,*) W(I), PQ(I), PT(I)
    XPRODQ(I) = 0.
    XPRODT(I) = 0.
    WRITE(8,540) W(I), PQ(I), PT(I)
35  CONTINUE
540 FORMAT(2X,3F13.4)

C_ _ _ _ _ _ _ _ _ _ _ _ _ _ _ _
C BEGIN PSS CALCULATIONS
C_ _ _ _ _ _ _ _ _ _ _ _ _ _ _ _
    DO 135 I = L,NVAR
    XPRODQ(I) = W(I)*PQ(I)
    XPRODT(I) = W(I)*PT(I)
135 CONTINUE
    SUMT = 0.
    SUMQ = 0.
    SUMQT = 0.
    DO 136 I = 1, NVAR
    SUMT = SUMT + XPRODT(I)*XPRODT(I)
    SUMQ = SUMQ + XPRODQ(I)*XPRODQ(I)
    SUMQT = SUMQT + (XPRODQ(I)-XPRODT(I))**2
136 CONTINUE
    PSS = SQRT(SUMQT/(SUMQ + SUMT))
    WRITE(8,137) PSS
137 FORMAT(LX,'DISTANCE BETWEEN OBJECTS Q AND T = ', F6.3/)
    END
C_ _ _ _ _ _ _ _ _ _ _ _ _ _ _ _ _ _
```

FIGURE 14-B

METHOD AND APPARATUS FOR VALIDATION OF MODEL-BASED PREDICTIONS

FIELD OF INVENTION

The present invention generally relates to a method for validating a model-based prediction in a data processing system and more specifically, to a method for validating whether selected models are applicable to selected queries and comparing the performance of the predictive model on a query object or point, etc., with the performance of the predictive model on an existing object having a shortest property sensitive similarity index from the query object, or point, etc. in a data processing system.

BACKGROUND OF INVENTION

Modeling a phenomenon in any field, such as biology, chemistry, physics, engineering, finance, sociology, toxicology, etc., provides insight into the factors controlling the phenomenon and enables the prediction of future trends without having to perform lengthy and costly experimental studies. For instance, a toxicological experiment to evaluate the carcinogenic potential of a chemical can take several years, consume millions of dollars, and cause unnecessary animal suffering.

A robust and predictive model, requiring only the structure of the chemical, may save unnecessary consumption of time, money, and life. However, a predictive model, generated from a limited set of available data, is representative of a closed system. Therefore, every model has a certain fixed domain of possible application. The model is not applicable outside of its fixed domain and therefore model-based predictions may not be reliable.

Quantitative Structure-Activity Relationship (QSAR) is a known technique to establish quantitative statistical models between structures and properties of chemicals. A number of QSAR models have been reported in the prior art to predict a variety of toxicological endpoints. However, no effort has been made to quantitatively define the application domain of these models. Some recommendations have been made to avoid QSARs resulting from chance correlations while some preliminary steps, employing univariate checking of independent variables, have been taken to define the application domain of the model. The prior art fails due to the fact that the application domain is a multivariate space and cannot be identified by univariate approaches.

Predictive models have always been sought in the physical, biological and social sciences, but the application of such models may not produce reliable results. Before accepting a prediction from any model, it is essential to ascertain that the model is applicable to make the prediction and compare the performance of the predictive model on a query object or point, etc., with the performance of the predictive model on an existing object having a shortest property sensitive similarity index from the query object, or point, etc. in a data processing system.

SUMMARY OF INVENTION

The present invention relates to a method for validating a predictive model-based prediction in a data processing system comprising the steps of: loading a predictive model having a number of training objects, and a plurality of independent predictor variables, the independent predictor variables having weights into a data processing system; collecting a plurality of independent predictor variables for a number of objects of the predictive model; generating a predictor space associated with the predictive model; defining a range of the predictor space in a given dimension; defining a rescaled predictor space; defining a transposed rescaled predictor space; determining an optimum prediction space (OPS); calculating a boundary of the optimum prediction space; determining a range of the optimum prediction space; calculating a periphery of the optimum prediction space; determining the distance of an object outside of the range of the optimum prediction space; obtaining weights of the independent predictor variables from the predictive model; determining a property-sensitive object similarity index (PSS) between a pair of objects; identifying a lowest index between the pair of objects; comparing the performance of the predictive model on an object; and storing the performance of the predictive model into the data processing system.

BRIEF DESCRIPTION OF THE DRAWINGS

FIG. 2 shows the central processing unit, or CPU, time required for 200 observations and various values of independent predictor variables, p;

FIG. 3 illustrates a general description of the problem;

FIGS. 4-A through 4-C show the P-Space associated with the given data in the present example;

FIGS. 5-A through 5-D show the S-Space matrix;

FIGS. 6-A through 6-F show the S'-Space matrix;

FIG. 7 defines the boundaries of the OPS in the present example;

FIGS. 8-A through 8-B show the values of the data points;

FIG. 9 summarizes the values of the $D_{OPS}$ at the edges of each dimension of the OPS for this example;

FIGS. 10-A through 10-C show the property-sensitive similarity between malathion and malaoxon for male mouse carcinogenicity; and FIGS. 11-A through 11-B show the property-sensitive similarity between malathion and malaoxon for female rat carcinogenicity;

FIGS. 12-A through 12-J show the FORTRAN code for the generation of the optimum prediction space of a predictive model;

FIGS. 13-A through 13-D show the FORTRAN code for investigating whether a query object may be within the optimum prediction space and computing the distance an object is outside the optimum prediction space;

FIGS. 14-A through 14-B show the FORTRAN code for determining the property-sensitive similarity index;

DETAILED DESCRIPTION OF THE PREFERRED EMBODIMENT

Validation of a prediction is essential for confident acceptance of any model based prediction. The present invention will be described using an example of a toxicological model. However, the present system is general in nature and can be applied to any predictive model, such as in the field of biology (prediction of pharmacological activity, etc.), chemistry (prediction of thermochemical properties, etc.), physics (prediction of stress, etc.), financial forecasting, engineering, sociology, and so forth.

The present system includes defining a multi-dimensional space associated with a predictive model, referred to as the optimum prediction space (OPS), and determining a property sensitive object similarity (PSS) between a training set object and a query object. A predictive model is applicable for objects (or points, structures, or any appropriate parameter) inside and near the periphery of the OPS of the model. The periphery of the OPS of the model is computed in terms of the distance of an object from the OPS. If the distance from the object to the OPS is smaller than the model's computed permissible limit on the distance from the OPS, the object is considered near the periphery of the OPS. The model based predicted value for the objects inside or near the periphery of the OPS can be deemed to be reliable.

However, the information density in the OPS is not uniformly distributed. Some regions may be more populated than others. The confidence in the predictions regarding an object inside the OPS can be evaluated by ascertaining (a) the information density in the vicinity of the query object, and (b) the performance accuracy of the model in the vicinity of the query object. Vicinity is measured in terms of the PSS distance between the query object and the training set objects. The PSS increases as the distance between the query object and the training set objects decreases.

The magnitude of the PSS distance from the closest object, the density of objects around that distance, and the performance accuracy of the model on the objects are important in building confidence in the reliability of the prediction made by the model. The predicted value of the model can be considered reliable and accepted with confidence when there is a sufficient density of objects at a small PSS distance and concordance between the values (1) predicted for the query object, (2) predicted for the training set objects of the model, and (3) experimentally assigned to the training set objects of the model.

Figure 16:
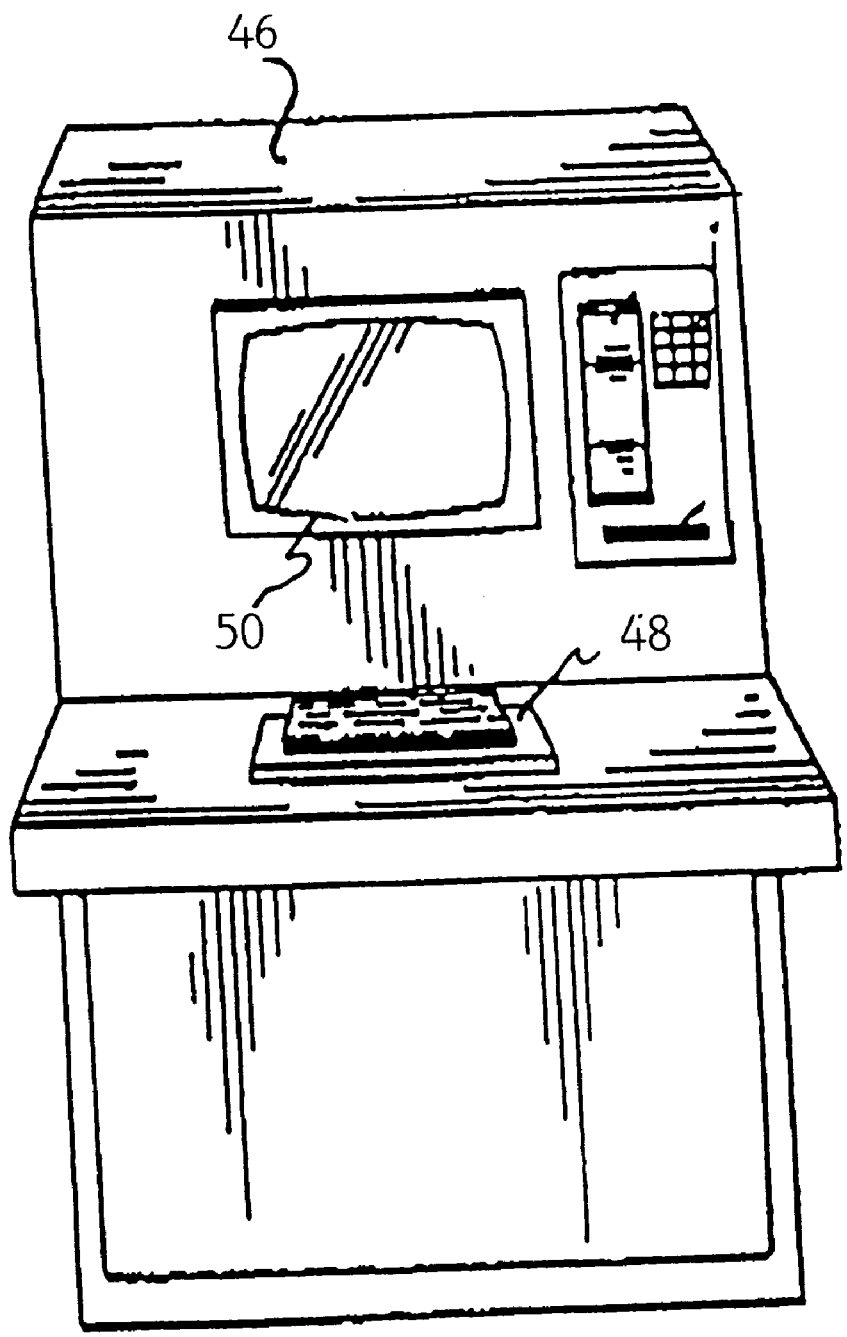
FIG. 16 shows a representative data processing system.

The system described herein may be performed using different computers, computer languages, calculators, or human brain power and a pencil and paper. Preferably, a computer language using a FORTRAN code, the FORTRAN code being attached in the computer code annex as FIGS. 12, 13 and 14, for implementation of the method is utilized. The FORTRAN code for the method was developed on a DEC Microvax II computer, available from Digital Equipment Corporation of Maynard, Mass. FIG. 16 shows a representative data processing system 46 having a monitor 50 and a keyboard 48. The central processing unit, or CPU, time required for 200 observations and various values of p are shown in FIG. 2.

Figure 15:
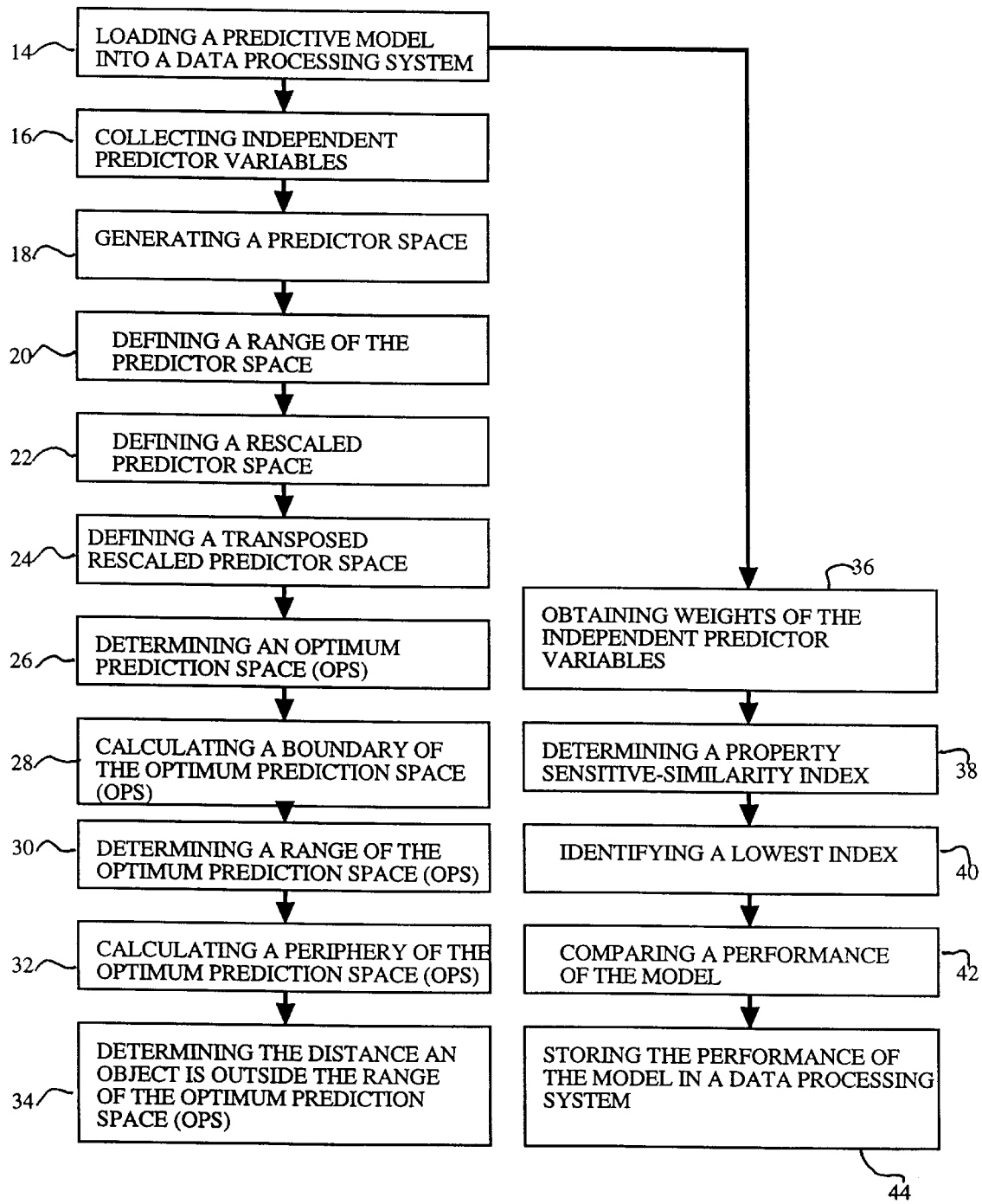
FIG. 15 is a block diagram illustrating the steps of the method in a data processing system.

In operation, as shown in block diagram form in FIG. 15, the method for validating a predictive model-based prediction comprises loading a predictive model having a number of training objects n, and a plurality of independent predictor variables p into a suitable data processing system 14. The independent predictor variables have weights w. The suitable data processing system may comprise any scientific program capable of facilitating the computations contemplated by the system of the present invention. Preferably, the accompanying FORTRAN code is used for the present system. It will be understood by one skilled in the art that each calculation, determination, definition, or equation may be stored into the data processing system.

The derivation of the OPS associated with a model is initiated by the collection of the values of p independent predictor variables (shown as 16 in FIG. 15), $P^i_j$, wherein i is 1 to n and j is 1 to p, for n points in the training set of the model. The n×p matrix P, shown in Equation 1, defines the predictor space 18, preferably referred to as a P-space.

$$P = \begin{vmatrix} P^1_1 & P^1_2 & P^1_3 & P^1_4 & \cdots & P^1_p \\ P^2_1 & P^2_2 & P^2_3 & P^2_4 & \cdots & P^2_p \\ P^3_1 & P^3_2 & P^3_3 & P^3_4 & \cdots & P^3_p \\ \vdots & \vdots & \vdots & \vdots & \cdots & \vdots \\ P^n_1 & P^n_2 & P^n_3 & P^n_4 & \cdots & P^n_p \end{vmatrix} \quad \text{(Equation 1)}$$

In this example, the p-dimensional P-space corresponds to a model based on n observations (rows) and p predictors (columns), including the constant term. The elements $P^i_1$ are all equal to 1 for i=1 to n, and constitute the unity vector corresponding to the constant term. It may be noted that the dependent variable is completely ignored in the derivation of the OPS, which makes the method applicable to any property in any field.

Referring to FIG. 15 and as shown by Equation 2, the range 20 of the P-space in any given dimension k, represented by $R^P_k$, is defined by the difference between the largest value $P^1_k$, and the smallest value $P^s_k$ of $P^i$ in the dimension k:

$$R^P_k = P^1_k - P^s_k \quad \text{(Equation 2)}$$

Since the predictor variables $P^i_j$ are not completely orthogonal in practice, the OPS, although a p-dimensional space similar to the P-Space, is smaller than the P-Space. Preferably, the objects in the P-Space having large variances of the predicted values of the response variable do not belong in the OPS. The extent of the compactness of the OPS in any plane depends on the intercorrelation of $P^i_j$ elements in that plane. The higher the correlation of $P^i_j$ elements, the narrower the OPS becomes relative to the P-Space.

In order to easily interpret the comparison between the P-Space and the OPS, the P-Space is rescaled to an S-Space according to Equations 3 and 4:

$$S^i_k = (2P^i_k - P^1_k - P^s_k)/(P^1_k - P^s_k), \quad \text{(Equation 3)}$$

$$\text{where } S^i_1 = 1; \quad \text{(Equation 4)}$$

in which i varies from 1 to n, k varies from 2 to p, and the superscript 1 refers to the largest predictor value in a given vector k and the superscript s refers to the smallest predictor value in a given vector k. Each n-element $P^i_k$ vector, in which k=2 to p, is rescaled so that the values of elements in each n-element $S^i_k$ vector, in which k=2 to p, range from −1 to +1. Thus, a value of −1 for an n-element $S^i_k$ vector corresponds to the smallest $P^i_k$ value while a value of +1 for an n-element $S^i_k$ vector corresponds to the largest $P^i_k$ value.

The S-Space is shown in Equation 5:

$$S = \begin{vmatrix} S^1_1 & S^1_2 & S^1_3 & S^1_4 & \cdots & S^1_p \\ S^2_1 & S^2_2 & S^2_3 & S^2_4 & \cdots & S^2_p \\ S^3_1 & S^3_2 & S^3_3 & S^3_4 & \cdots & S^3_p \\ \vdots & \vdots & \vdots & \vdots & \cdots & \vdots \\ S^n_1 & S^n_2 & S^n_3 & S^n_4 & \cdots & S^n_p \end{vmatrix} \quad \text{(Equation 5)}$$

The step of rescaling predictor space is represented by 22 in FIG. 15.

The OPS 26 is obtained by computing the eigenvalues $\epsilon_k$, in which k=1 to p, and the eigenvectors $E_{jk}$, in which j=1 to p and k=1 to p, of the product, the S'S-Space matrix, of the original S-Space matrix and its transposed matrix S'-Space. The S'-Space matrix (referred to as 24 in FIG. 15) is the transpose of matrix S-Space and is shown according to Equation 6:

$$S' = \begin{vmatrix} S^1_1 & S^2_1 & S^3_1 & S^4_1 & \cdots & S^n_1 \\ S^1_2 & S^2_2 & S^3_2 & S^4_2 & \cdots & S^n_2 \\ S^1_3 & S^2_3 & S^3_3 & S^4_3 & \cdots & S^n_3 \\ \vdots & \vdots & \vdots & \vdots & \cdots & \vdots \\ S^1_p & S^2_p & S^3_p & S^4_p & \cdots & S^n_p \end{vmatrix}$$ (Equation 6)

A dimension of the optimum prediction space is defined by the linear combination of the values of the independent predictor variables p of the S-Space matrix, as shown according to Equation 7:

$$OPS^i_k = E_{k1}S^i_1 + E_{k2}S^i_2 + \ldots E_{kp}S^i_p$$ (Equation 7)

wherein $E_{kp}$ is the eigenvector of a k-th dimension and i is 1 to p and k is 1 to p.

The magnitude of the eigenvectors $E_{jk}$ determine the contribution of each of the p dimensions.

The step of determining the boundary of the OPS is represented by 28 in FIG. 15.

The range of the OPS (30 in FIG. 15) in each of the p dimensions of the S-Space is determined by the linear combination of p dimensions of the S-Space, as shown by Equation 8:

$$R^{OPS}_k = OPS^1_k - OPS^s_k$$ (Equation 8)

The magnitude of the k-th eigenvalue, $\epsilon_k$, determines the compactness of the OPS in the k-th dimension; the larger the value, the smaller the difference between the OPS and the P-Space. In fact, Eqn (7) could be readily expressed in terms of the P-Space to evaluate differences between the P-Space and the OPS. The step of calculating a periphery of the OPS as a product of n and p is shown as 32 in FIG. 15. The range, the periphery, boundary, and the definition of the OPS may be stored into the data processing system.

Figure 1:
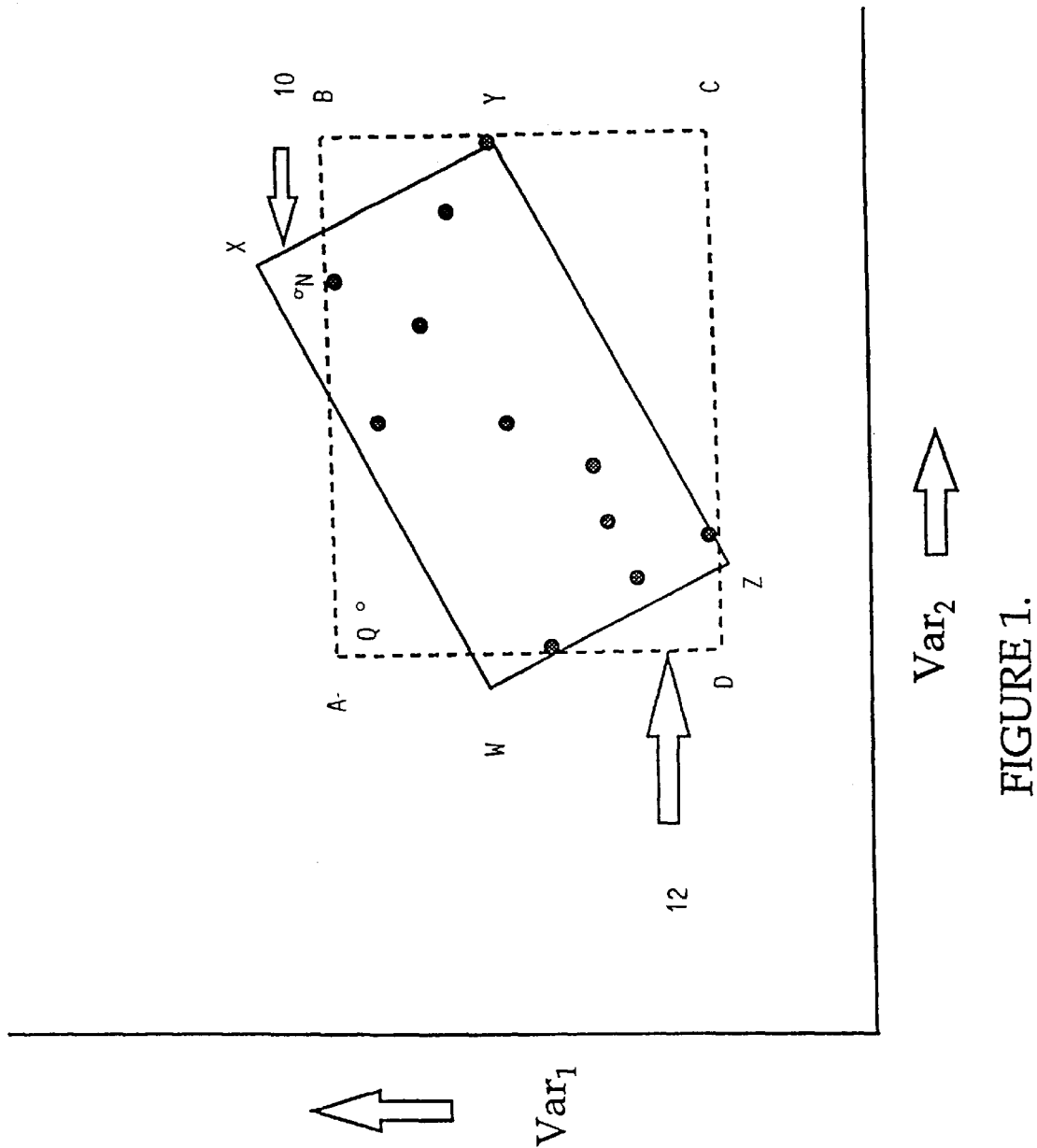
FIG. 1 illustrates the difference between OPS and P-Space for a two-dimensional space according to the present invention.

A visual proof of the difference between OPS and P-Space is not easy for three-dimensional space, and is not possible for spaces with more dimensions. For a two-dimensional space, the situation may be displayed as shown in FIG. 1. In FIG. 1, the objects A,B,C, and D define the P-Space 10, whereas the OPS 12 is defined by the objects W, X, Y, and Z. It is obvious that an object such as Q is outside the OPS in spite of being in the P-Space, whereas the object N, despite being outside the P-Space, is inside the OPS.

An object i for which the value of $OPS^i_k$ for all values of k is smaller than $OPS^1_k$ but greater than $OPS^s_k$ is considered to be located in the OPS. By definition, the n training set observations of the model are always inside the OPS. However, a query object being in the OPS does not mean that the predicted variable at that object will have concordance with the experimental value. It only implies that the model is applicable at this object, and the probability of concordance between the predicted value and the actual value is only as high as that for the training set of objects.

When a given object is outside the OPS, it is possible to compute its distance from the OPS. Obviously, the farther it is from the OPS, the greater the unreliability in the prediction from the model.

The determination of a distance of an object outside the OPS, (see 34 in FIG. 15), $D_{OPS}$, can be expressed by Equation 9 as follows:

(Equation 9)

$$D_{OPS} = (OPS^i_1)^2/\epsilon_1 + (OPS^i_2)^2/\epsilon_2 + (OPS^i_3)^2/\epsilon_3 + \ldots + (OPS^i_p)^2/\epsilon_p,$$

wherein $\epsilon_p$ represents the eigenvalues of the p dimension.

On the basis of the knowledge gained by the application of this method to a variety of toxicity endpoints, a value of $D_{OPS}$ preferably equal to 5p/2n has been set as the permissible limit. A value of $D_{OPS}$ preferably equal to or less than 5p/2n allows an investigator to confidently predict that an object is within the range of the OPS. The value of $D_{OPS}$ may be stored in the data processing system.

PSS Analysis

The PSS analysis also requires the values of the p independent predictor variables, $P_{ij}$, in the model. In addition, the weights, $w_i$, of these p variables, obtained during the model development process from the predictive model 36, are also needed to calculate the PSS distance. The PSS distance, or $PSS_{qt}$ index, between two objects, the query object, q, and the training set object, t, is computed (38) as follows:

$$PSS_{qt} = \{\Sigma(X^q_i - X^t_i)^2 / [\Sigma(X^q_i)^2 + \Sigma(X^t_i)^2]\}^{1/2}$$ (Equation 10)

where $X^k_i = P^k_i * w_i,$ (Equation 11)

wherein i is 1 to p, k is either q or t, and q is the query object and t is the training set object.

In Equations 10 and 11, i varies from 1 to p. When the properties of the objects are identical, the numerator in Eq (10) will be zero, thus making $PSS_{qt}$ equal to zero. The value of $PSS_{qt}$ will be unity when q and t have no overlapping non-zero $X^k_j$ terms. When the signs of weighted contributions $X^q_j$, and $X^t_j$ do not match, the $PSS_{qt}$ may be greater than one; which, like a $PSS_{qt}$ of unity, is an indication of great property-sensitive dissimilarity between the query object and the training set objects.

Once a series of $PSS_{qt}$ indices have been determined for a query object and a series of training set objects, a lowest index is determined for the PSS between the query object and the training set objects 40. The lowest index is identified by sorting the values of the $PSS_{qt}$ indices according to the highest values and the lowest values. Thus, by identifying the lowest $PSS_{qt}$ index, the researcher may then compare the performance of the model on an object 42, preferably a nearest query object. The researcher may use the property-sensitive similarity index to compare the performance of the predictive model on a query object or point, etc., with the performance of the predictive model on an existing object having a shortest property-sensitive similarity index from the query object, or point, etc. in a data processing system. The PSS index may be stored into the data processing system 44.

The researcher or individual may ascertain whether the model is applicable to make the prediction. As previously stated, the predicted value of the model can be considered reliable and accepted with confidence when there is a sufficient density of objects at a small PSS distance and concordance between the values (1) predicted for the query object, (2) values predicted for the training set objects of the model, and (3) values experimentally assigned to the training set objects of the model. The performance of the model may also be stored into the data processing system.

EXAMPLE 1

For illustrative purposes only, the following example is provided to demonstrate the calculation of the OPS and the $D_{OPS}$. The classical Iris data, as would be readily understood by one skilled in the prior art, was employed for the present example.

FIG. 3 illustrates a predictive model having a number of data points (150), variables (4) and a constant (INTERCEPT), and the names of the variables. The names of the variables in the Iris data are well known to a person skilled in the art.

FIG. 4 shows the predictor space, or P-Space, associated with the given data in the present example. The P-Space is defined by the n×p matrix P, shown in Equation 1. The five dimensions are equal to the number of variables. FIG. 4 also allows for the verification of the input data.

FIG. 5 shows the S-Space matrix obtained by applying Equations 3, 4 and 5.

Figure 6:
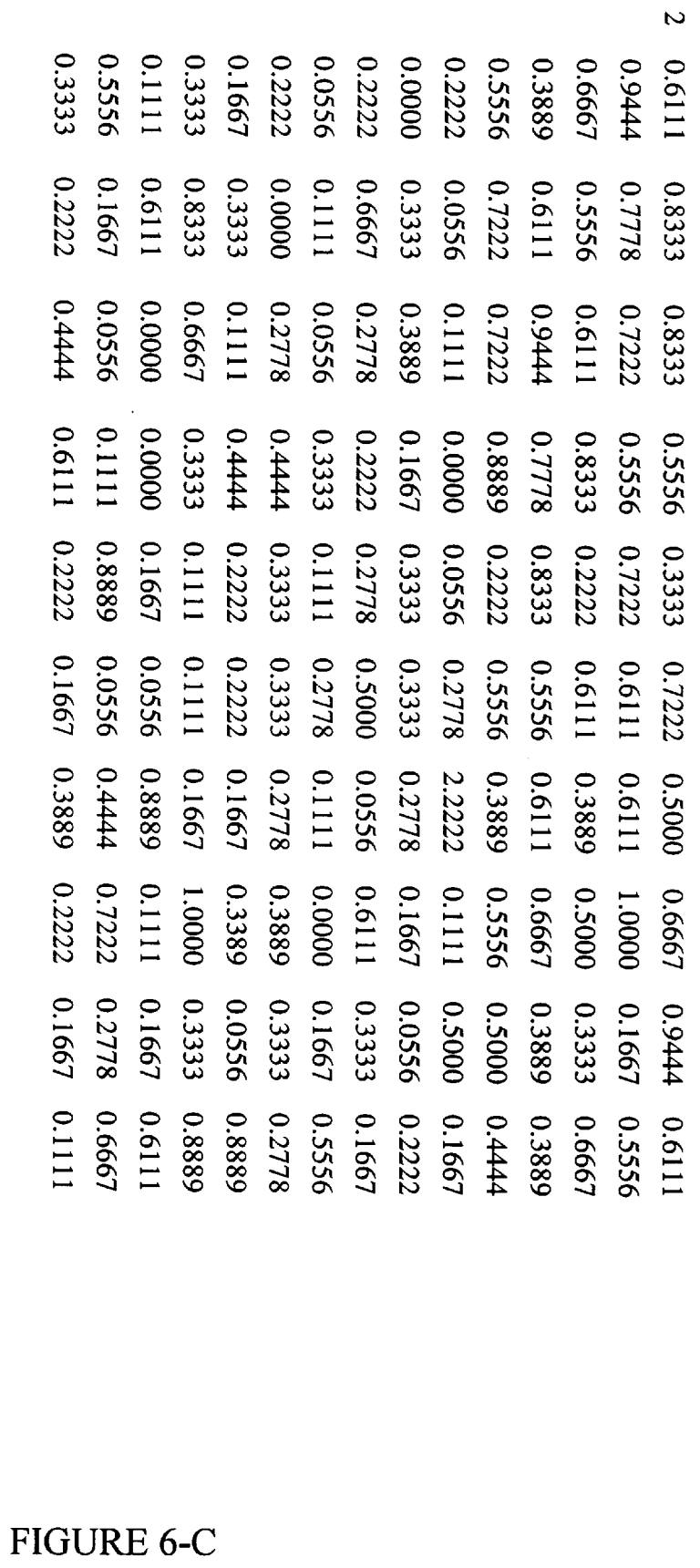

FIG. 6 is the S'-Space matrix, defined by Equation 6, which is the transposed S-Space matrix. The S'-Space matrix comprises 150 columns and 5 rows.

FIG. 7 defines the boundaries of the OPS in the 5 dimensions. The boundaries are defined by Equation 7. As shown by this particular example, the second dimension of this example imposes the least restrictions on the P-Space; that is, the OPS and the P-Space are not significantly different in the second dimension.

Assuming each data point to be outside the training set, the program computes its distance $D_{OPS}$ from the OPS. The values for the $D_{OPS}$, calculated according to Equation 9, for all 150 data points are provided in FIG. 8.

FIG. 9 summarizes the values of the $D_{OPS}$ at the edges of each dimension of the OPS for this example.

EXAMPLE 2

To demonstrate the computation of the PSS distance, $PSS_{qt}$, the insecticide malathion (Chemical Abstract Service No. 121-75-5), available from American Cyanamid of Princeton, N.J., is selected as the query object q and malaoxon (Chemical Abstract Service No. 1634-78-2), at one time manufactured by Gulf South Research Institute, is used as the training set object t.

Malathion (Chemical Abstract Number 121-75-5)

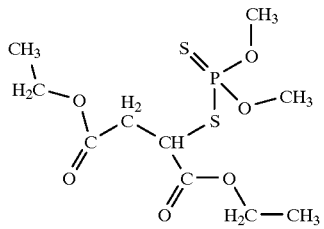

Malaoxon (Chemical Abstract Service No. 1634-78-2)

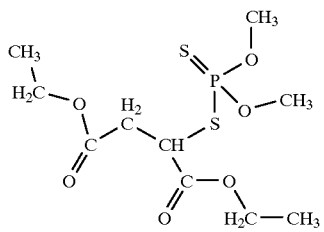

The PSS for male mouse carcinogenicity (MMC) and for female rat carcinogenicity (FRC) has been computed based on well known discriminant models, preferably employing the toxicity prediction system TOPKAT 3.0, available from Health Designs, Inc. of Rochester, N.Y. For male mouse carcinogenicity, 60 determinants have been identified in the TOPKAT 3.0 MMC model. Therefore, $PSS^{MMC}_{qt}$ between malathion and malaoxon is based on a model having 60-variables, i.e., p=60. The FRC model in TOPKAT 3.0, however, identified 51 determinants of FRC (as shown in FIG. 10). The $PSS^{FRC}_{qt}$ between malathion and malaoxon is based on these 51 descriptors. The number of determinants and the structural attributes the determinants represent are different for the two properties of male mouse carcinogenicity, MMC, and female rat carcinogenicity, FRC.

Employing the method of PSS calculation as described herein; calculated according to Equations 10 and 11:

$$PSS_{qt} = \{\Sigma(X^q_i - X^t_i)^2 / [\Sigma(X^q_i)^2 + \Sigma(X^t_i)^2]\}^{1/2} \quad \text{(Equation 10)}$$

$$\text{where } X^k_i = P^k_i * w_i, \quad \text{(Equation 11)}$$

wherein i is 1 to p, k is either q or t, and q is the query object, malathion, t is the training set object, malaoxon, and $X^k_i$ is the product of $P^k_i$ and $w_i$;

the value of $PSS^{MMC}_{qt}$ is calculated to be 0.014, while that of $PSS^{FRC}_{qt}$ is calculated to be 0.318 when the weights of the independent predictor variables, $w_i$, and the values of the independent variables, $P^k_i$, in FIG. 9 and FIG. 10 are used. The fact that the $PSS^{MMC}_{qt}$ and $PSS^{FRC}_{qt}$ are different proves the hypothesis that similarity is property sensitive.

While a specific embodiment of the invention has been disclosed, variations in detail, within the scope of the appended claims, are possible. There is no intention of limitation to what is disclosed in the abstract or the exact disclosure as herein presented. The above described examples are only illustrative of the application of the principles of the invention. Other applications may be devised by those skilled in the art without departing from the scope and spirit of the invention.

What is claimed is:

1. A method for validating a predictive model-based prediction comprising the steps of:

(a) loading a predictive model having a number of training objects, and a plurality of independent predictor variables, the independent predictor variables having weights, into a data processing system;

(b) collecting a plurality of independent predictor variables for a number of objects of the predictive model;

(c) generating a predictor space associated with the predictive model;

(d) defining a range of the predictor space in a given dimension;

(e) defining a rescaled predictor space, the rescaled predictor space defined as an S-Space, the S-Space calculated according to the formula:

$$S^i_k = (2P^i_k - P^1_k - P^s_k)/(P^1_k - P^s_k),$$

where $S^i_1 = 1$;

wherein i is 1 to n, k is 2 to p, and the superscript 1 is the largest predictor value in a given vector k and the superscript s is the smallest predictor value in a given vector k;

(f) defining a transposed rescaled predictor space;

(g) determining an optimum prediction space;

(h) calculating a boundary of the optimum prediction space;

(i) determining a range of the optimum prediction space;

(j) calculating a periphery of the optimum prediction space;

(k) determining a distance of an object outside of the range of the optimum prediction space;

(l) obtaining weights of the independent predictor variables from the predictive model;

(m) determining a property sensitive object similarity index between a pair of objects;

(n) identifying a lowest index between the pair of objects; and (o) determining a performance of the predictive model on an object.

2. The method as defined in claim 1 in which the number of independent predictor variables is p.

3. The method as defined in claim 1 in which the prediction space is represented by a matrix for a model based on a plurality of observations and a plurality of predictors, the model including a constant term.

4. The method as defined in claim 3 in which the constant term corresponds to a unity vector wherein values of the first predictor variable for an ith object are all equal to 1 wherein i is 1 to n, wherein n is the number of training set objects.

5. The method as defined in claim 4 in which the value of the first predictor variable is $P^i_1$.

6. The method as defined in claim 4 in which the periphery of the optimum prediction space is a product of n and p.

7. The method as defined in claim 1 in which the range of the predictor space in a dimension is determined by calculating the difference between the largest predictor space value and the smallest predictor space value in the dimension.

8. The method as defined by claim 1 in which the transposed rescaled predictor space is an S'-Space matrix.

9. The method as defined by claim 1 in which the optimum prediction space of the independent predictor variables is determined by the product of the S-Space matrix and the S'-Space matrix.

10. The method as defined by claim 1 in which the boundary of the optimum prediction space of the model is determined by defining every dimension of the optimum prediction space by the linear combination of the independent predictor variables of the S-Space matrix.

11. The method as defined by claim 1 in which a dimension of the optimum predictor space is defined by a linear combination of the values of the independent predictor variables of the S-Space matrix represented by the equation:

$$OPS^i_k = E_{k1}S^i_1 + E_{k2}S^i_2 + \ldots E_{kp}S^i_p$$

wherein $E_{kp}$ is the eigenvector of a k-th dimension.

12. The method as defined by claim 1 in which the distance an object is outside the range of the optimum predictor space is determined by the equation:

$$D_{OPS} = (OPS^i_1)^2/\epsilon_1 + (OPS^i_2)^2/\epsilon_2 + (OPS^i_3)^2/\epsilon_3 + \ldots + (OPS^i_p)^2/\epsilon_p$$

wherein $\epsilon_p$ is the eigenvalue of the p dimension.

13. The method as defined by claim 12 in which the value of the $D_{OPS}$ is 5p/2n wherein p is the value of the independent predictor variable and n is the number of points in the training set of the model.

14. The method as defined by claim 1 in which determining the property-sensitive object similarity index between a query object and a training set object is expressed by the equation:

$$PSS_{qt} = \{\Sigma(X^q_i - X^t_i)^2 / [\Sigma(X^q_i)^2 + \Sigma(X^t_i)^2]\}^{1/2}$$

where $X^k_i = P^k_i \ast w_i$, wherein i is 1 to p; k is q or t; w is the weight of an independent predictor variable; q is the query object and; t is the training set object.

15. The method as defined by claim 1 wherein the compactness of the optimum predictor space in a plane is determined by the intercorrelation of $P^i_j$ elements in the plane, wherein i is 1 to p and j is 1 to p.

16. The method as defined by claim 1 in which the values of elements in the $S^i_k$ vector are from −1 to 1, wherein the value of −1 is the smallest $P^i_k$ value and the value of 1 is the largest $P^i_k$ value.

17. A method for validating a predictive model-based prediction comprising the steps of:

(a) loading a predictive model having a number of training objects n, and a plurality of independent predictor variables p, the independent predictor variables having weights w, into a data processing system;

(b) collecting a plurality of independent predictor variables for a number of objects of the predictive model;

(c) generating a predictor space associated with the predictive model into the data processing system, the predictor space being represented by a matrix for a model based on a plurality of observations and a plurality of independent predictor variables including a constant term, the constant term corresponding to a unity vector in which the value of a first predictor variable for an ith object is equal to 1 for i=1 to n, the value of the first predictor variable is $P^i_1$;

(d) defining a range of the predictor space in a given dimension by calculating the difference between the largest predictor values and the smallest predictor values in the dimension;

(e) rescaling the predictor space to an S-Space matrix according to:

$$S^i_k = (2P^i_k - P^1_k - P^s_k)/(P^1_k - P^s_k),$$

where $S^i_1 = 1$;

wherein i is 1 to n, k is 2 to p, and the superscript 1 is the largest predictor value in a given vector k and the superscript s is the smallest predictor value in a given vector k;

(f) transposing the S-Space matrix to an S'-Space matrix;

(g) generating an optimum prediction space by computing the eigenvalues and eigenvectors of a product of the S-Space matrix and the S'-Space matrix;

(h) calculating a boundary of the optimum prediction space of the model by defining a dimension of the optimum prediction space by linearly combining the values of the independent predictor variables of the S-Space matrix by the equation $$OPS^i_k = E_{k1}S^i_1 + E_{k2}S^i_2 + \ldots E_{kp}S^i_p$$

wherein $E_{kp}$ is the eigenvector of a k-th dimension and i is 1 to p and k is 1 to P;

(i) defining a range of the optimum prediction space in a given dimension by calculating a difference between the largest predictor value and the smallest predictor value in the dimension of the optimum prediction space according to the formula:

$$R^{OPS}_k = OPS^1_k - OPS^s_k;$$

(j) calculating a periphery of the optimum prediction space as a product of n and p;

(k) determining a distance an object is outside the range of the optimum prediction space by the equation:

$$D_{OPS}=(OPS^i_1)^2/\epsilon_1+(OPS^i_2)^2/\epsilon_2+(OPS^i_3)^2/\epsilon_3+ \ldots +(OPS^i_p)^2/\epsilon_p,$$

wherein $\epsilon_p$ is the eigenvalue of the p dimension;

(l) obtaining weights of the independent predictor variables of the model;

(m) determining a property-sensitive object similarity index between a query object and a training set object by the equation:

$$PSS_{qt}=\{\Sigma(X^q_i-X^t_i)^2/[\Sigma(X^q_i)^2+\Sigma(X^t_i)^2]\}^{1/2}$$

where $X^k_i=P^k_i*w_i,$ wherein i is 1 to p; k is q or t; q is the query object; t is the training set object and $p^k_i$ is a predictor variable for an i-th object in a k-th dimension;

(n) identifying a training set object having a lowest index between the query object and the training set object; and (o) comparing the performance of the predictive model on the query object and a nearest training set object to assess the validity of the predictive model.

18. A method for validating a predictive model-based prediction comprising:

(a) loading a predictive model having a number of training objects n, and a plurality of independent predictor variables p, the independent predictor variables having weights w, into a data processing system;

(b) obtaining weights of the independent predictor variables of the model;

(c) determining a property-sensitive object similarity index between a query object and a training set object by the equation:

$$PSS_{qt}=\{\Sigma(X^q_i-X^t_i)^2/[\Sigma(X^q_i)^2+\Sigma(X^t_i)^2]\}^{1/2}$$

where $X^k_i=P^k_i*w_i,$ wherein i is 1 to p; k is q or t; q is the query object; t is the training set object and $P^k_i$ is a predictor variable for an i-th object in a k-th dimension;

(d) identifying a training set object having a lowest index between the query object and the training set object; and (e) comparing the performance of the predictive model on the query object and a nearest training set object to identify a validity of the predictive model.

19. In a data processing system, a method for validating a predictive model-based prediction comprising the steps of:

(a) loading a predictive model having a number of training objects n, and a plurality of independent predictor variables p, the independent predictor variables having weights w, into the data processing system;

(b) collecting a plurality of independent predictor variables for a number of objects of the predictive model;

(c) generating a predictor space associated with the predictive model into the data processing system, the predictor space being represented by a matrix for a model based on a plurality of observations and a plurality of independent predictor variables including a constant term, the constant term corresponding to a unity vector in which the value of a first predictor variable for an ith object is equal to 1 for i=1 to n, the value of the first predictor variable is $P^i_1$;

(d) defining a range of the predictor space in a given dimension by calculating the difference between the largest predictor values and the smallest predictor values in the dimension;

(e) rescaling the predictor space to an S-Space matrix according to:

$$S^i_k=(2P^i_k-P^1_k-P^s_k)/(P^1_k-P^s_k),$$

where $S^i_1=1;$ wherein i is 1 to n, k is 2 to p, and the superscript 1 is the largest predictor value in a given vector k and the superscript s is the smallest predictor value in a given vector k;

(f) transposing the S-Space matrix to an S'-Space matrix;

(g) generating an optimum prediction space by computing the eigenvalues and eigenvectors of a product of the S-Space matrix and the S'-Space matrix;

(h) calculating a boundary of the optimum prediction space of the model by defining a dimension of the optimum prediction space by linearly combining the values of the independent predictor variables of the S-Space matrix by the equation $$OPS^i_k=E_{k1}S^i_1+E_{k2}S^i_2+ \ldots E_{kp}S^i_p$$

wherein $E_{kp}$ is the eigenvector of a k-th dimension and i is 1 to p and k is 1 to p;

(i) defining a range of the optimum prediction space in a given dimension by calculating a difference between the largest predictor value and the smallest predictor value in the dimension of the optimum prediction space according to the formula:

$$R^{OPS}_k=OPS^1_k-OPS^s_k;$$

(j) calculating a periphery of the optimum prediction space as a product of n and p; and (k) storing the periphery of the optimum prediction space in the data processing system;

(l) determining a distance an object is outside the range of the optimum prediction space by the equation:

$$D_{OPS}=(OPS^i_1)^2/\epsilon_1+(OPS^i_2)^2/\epsilon_2+(OPS^i_3)^2/\epsilon_3+ \ldots +(OPS^i_p)^2/\epsilon_p,$$

wherein $\epsilon_p$ is the eigenvalue of the p dimension;

(m) storing the distance an object is outside the range of the optimum prediction space in the data processing system.

20. The method as defined in claim 17 wherein the method is applied to a toxicological model.

21. The method as defined in claim 17 wherein the method is applied to a financial model.

22. The method as defined in claim 17 wherein the method is applied to a engineering model.

23. The method as defined in claim 17 wherein the method is applied to a biological model.

24. The method as defined in claim 17 wherein the method is applied to a sociological model.

25. The method as defined in claim 17 wherein the method is applied to a physics model.

26. The method as defined in claim 17 wherein the method is applied to a chemical model.

27. A method for validating a predictive model-based prediction comprising the steps of:
  (a) loading a predictive model having a number of training objects, and a plurality of independent predictor variables, the independent predictor variables having weights, into a data processing system;
  (b) collecting a plurality of independent predictor variables for a number of objects of the predictive model;
  (c) generating a predictor space associated with the predictive model;
  (d) defining a range of the predictor space in a given dimension;
  (e) defining a rescaled predictor space, the rescaled predictor space is an S-Space, the S-Space calculated according to the formula:

$$S^i_k = (2P^i_k - P^1_k - P^s_k)/(P^1_k - P^s_k),$$

where $S^i_1 = 1$;

wherein i is 1 to n, k is 2 to p, and the superscript 1 is the largest predictor value in a given vector k and the superscript s is the smallest predictor value in a given vector k;
  (g) determining an optimum prediction space;
  (h) calculating a boundary of the optimum prediction space;
  (i) determining a range of the optimum prediction space; and
  (j) calculating a periphery of the optimum prediction space to provide a basis for validating the predictive model.

28. A method for validating a predictive model-based prediction, comprising:
  (a) identifying a predictive model;
  (b) collecting predictor variables, the predictor variables having weights;
  (c) determining a property-sensitive object similarity index between a query object and a training set object according to $PSS_{qt} = \{\Sigma(X^q_i - X^t_i)^2 / [\Sigma(X^q_i)^2 + \Sigma(X^t_i)^2]\}^{1/2}$ where $X^k_i = P^k_i * w_i$, and wherein i is 1 to p; k is q or t; w is the weight of an independent predictor variable; q is the query object and t is a training set object;
  (d) identifying a training set object having a lowest index between a query object and the training set object; and
  (e) comparing the performance of the predictive model on the query object and a nearest training set object to determine the validity of the predictive model.

29. An apparatus for validating a predictive model, comprising:
  (a) a computer processor for processing data;
  (b) a storage device operably connected to the computer processor for storing a predictive model having a number of training objects, and a plurality of independent predictor variables, the independent predictor variables having weights, and a plurality of independent predictor variables for a number of objects of the predictive model;
  (c) means for generating a predictor space associated with the predictive model;
  (d) means for defining a range of the predictor space in a given dimension;
  (e) means for defining a rescaled predictor space, the rescaled predictor space is an S-Space, the S-Space calculated according to the formula:

$$S^i_k = (2P^i_k - P^1_k - P^s_k)/(P^1_k - P^s_k),$$

where $S^i_1 = 1$;

wherein i is 1 to n, k is 2 to p, and the superscript 1 is the largest predictor value in a given vector k and the superscript s is the smallest predictor value in a given vector k;
  (f) means for determining an optimum prediction space;
  (g) means for calculating a boundary of the optimum prediction space;
  (h) means for determining a range of the optimum prediction space; and
  (i) means for calculating a periphery of the optimum prediction space to assess the validity of the predictive model.

* * * * *

UNITED STATES PATENT AND TRADEMARK OFFICE
CERTIFICATE OF CORRECTION

PATENT NO. : 6,036,349
DATED : March 14, 2000
INVENTOR(S) : Vijay K. Gombar

It is certified that error appears in the above-identified patent and that said Letters Patent is hereby corrected as shown below:

On the title page, insert the following item:

--[60] Provisional Application No. 60/001,562, Jul. 27, 1995--.

Column 1, line 4, insert the following:
    --CROSS REFFERENCE TO RELATED APPLICATION
Reference is made to and priority claimed from U.S. provisional application Ser. No.60/001,562, filed Nov. 2, 1995--.

Signed and Sealed this

First Day of August, 2000

Attest:

Q. TODD DICKINSON

*Attesting Officer*   *Director of Patents and Trademarks*